United States Patent
Barak et al.

(10) Patent No.: US 7,574,179 B2
(45) Date of Patent: Aug. 11, 2009

(54) MOBILE BROADBAND WIRELESS NETWORK WITH INTERFERENCE MITIGATION MECHANISM TO MINIMIZE INTERFERENCE WITHIN A CLUSTER DURING MULTIPLE CONCURRENT TRANSMISSIONS

(75) Inventors: Oz Barak, Hod Hasharon (IL); Assaf Touboul, Natanya (IL)

(73) Assignee: Designart Networks Ltd, Ra'Anana (IL)

( * ) Notice: Subject to any disclaimer, the term of this patent is extended or adjusted under 35 U.S.C. 154(b) by 174 days.

(21) Appl. No.: 11/623,774

(22) Filed: Jan. 17, 2007

(65) Prior Publication Data

US 2008/0049672 A1 Feb. 28, 2008

Related U.S. Application Data

(62) Division of application No. 11/623,110, filed on Jan. 15, 2007.

(60) Provisional application No. 60/843,079, filed on Sep. 8, 2006, provisional application No. 60/830,727, filed on Jul. 13, 2006.

(51) Int. Cl.
*H04B 1/02* (2006.01)
*H03C 7/02* (2006.01)
*H04W 36/00* (2006.01)
*H04W 72/00* (2006.01)
*H40B 7/00* (2006.01)
*H04B 1/38* (2006.01)

(52) U.S. Cl. .................. 455/101; 455/441; 455/444; 455/450; 455/458; 455/502; 340/539.1; 340/572.7; 342/432; 370/210; 370/217; 370/235; 370/328; 370/330; 705/37; 709/249; 375/295; 714/752; 714/776

(58) Field of Classification Search .............. 340/539.1, 340/572.7; 370/210, 217, 328, 329, 330, 370/235; 342/432; 455/441, 444, 458, 574, 455/101, 450, 502, 562.1; 714/752, 776; 705/37; 708/249; 375/295
See application file for complete search history.

(56) References Cited

U.S. PATENT DOCUMENTS

| | | | |
|---|---|---|---|
| 7,015,809 B1 * | 3/2006 | Sayers et al. | 340/539.1 |
| 7,042,394 B2 * | 5/2006 | Sayers | 342/432 |
| 7,221,268 B2 * | 5/2007 | Sayers et al. | 340/539.1 |
| 7,280,073 B2 * | 10/2007 | Sayers | 342/432 |
| 2006/0035676 A1 * | 2/2006 | Sayers et al. | 455/562.1 |
| 2006/0066484 A1 * | 3/2006 | Sayers | 342/432 |
| 2006/0071794 A1 * | 4/2006 | Sayers et al. | 340/572.7 |
| 2006/0071853 A1 * | 4/2006 | Sayers | 342/432 |
| 2006/0167784 A1 * | 7/2006 | Hoffberg | 705/37 |
| 2006/0223460 A1 * | 10/2006 | Himayat et al. | 455/101 |
| 2006/0262876 A1 * | 11/2006 | LaDue | 375/295 |

(Continued)

*Primary Examiner*—William D Cumming
(74) *Attorney, Agent, or Firm*—Deborah A. Gabor

(57) ABSTRACT

A mobile broadband wireless system including at least two pairs of nodes arranged in a cluster, each pair coupled to form a link for wireless communication. Each node includes an RF transceiver with associated modem, an antenna array arrangement coupled to the modem and arranged for multiple concurrent transmissions, where each antenna has a beam pattern selected to improve quality of transmission, and a controller for controlling the transceiver, modem and antenna array arrangement for providing point to point communication. The controller allocates MIMO streams and modulation to different antennas in the antenna array arrangement, and implements at least one interference mitigation mechanism to minimize interference within the cluster during multiple concurrent transmissions. A method of wireless communication is also provided.

55 Claims, 15 Drawing Sheets

U.S. PATENT DOCUMENTS

| | | | |
|---|---|---|---|
| 2006/0294446 A1* | 12/2006 | Chun et al. | 714/752 |
| 2007/0002742 A1* | 1/2007 | Krishnaswamy et al. | 370/235 |
| 2007/0076649 A1* | 4/2007 | Lin et al. | 370/328 |
| 2007/0079012 A1* | 4/2007 | Walker | 709/249 |
| 2007/0087756 A1* | 4/2007 | Hoffberg | 455/450 |
| 2007/0087767 A1* | 4/2007 | Pareek et al. | 455/502 |
| 2007/0105567 A1* | 5/2007 | Mohanty et al. | 455/458 |
| 2007/0105600 A1* | 5/2007 | Mohanty et al. | 455/574 |
| 2007/0155387 A1* | 7/2007 | Li et al. | 455/441 |
| 2007/0180344 A1* | 8/2007 | Jacobsen et al. | 714/752 |
| 2007/0180349 A1* | 8/2007 | Jacobsen | 714/776 |
| 2007/0211661 A1* | 9/2007 | Tee et al. | 370/329 |
| 2008/0025208 A1* | 1/2008 | Chan | 370/217 |
| 2008/0049672 A1* | 2/2008 | Barak et al. | 370/330 |
| 2008/0080364 A1* | 4/2008 | Barak et al. | 370/210 |
| 2008/0090575 A1* | 4/2008 | Barak et al. | 455/444 |

* cited by examiner

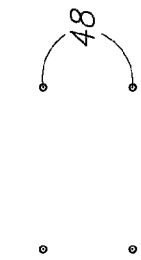
TYPE II
FIG. 5D
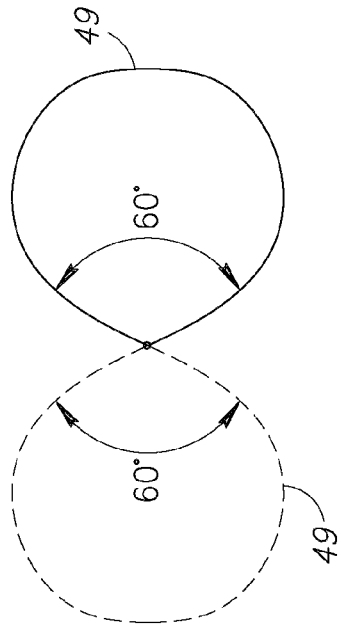
FIG. 5E
TYPE I
FIG. 5A
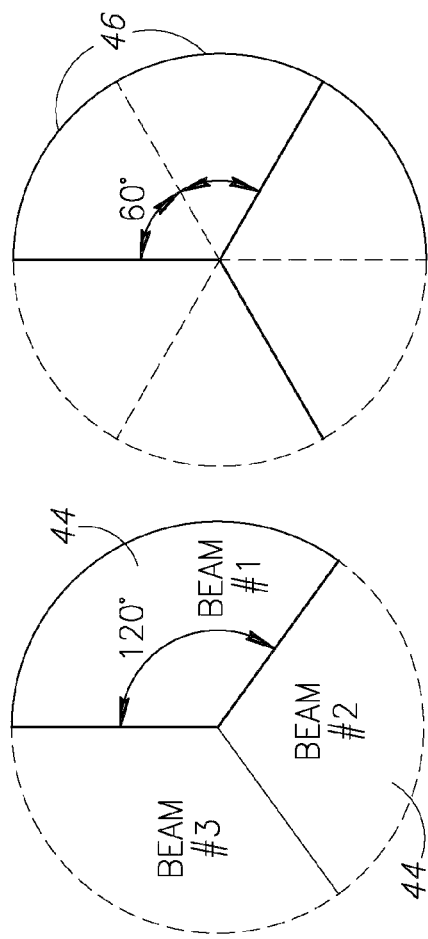
FIG. 5C
FIG. 5B

T1: A → B1, B5 → B4

T2: A → B3, B1 → B6

T3: A → B5, B3 → B2

MOBILE BROADBAND WIRELESS NETWORK WITH INTERFERENCE MITIGATION MECHANISM TO MINIMIZE INTERFERENCE WITHIN A CLUSTER DURING MULTIPLE CONCURRENT TRANSMISSIONS

This application claims the benefit of Provisional Applications Nos. 60/830,727, filed 13 Jul. 2006, 60/843,079, filed 8 Sep. 2006, and utility application U.S. Ser. No. 11/623,110 filed 15 Jan. 2007.

FIELD OF THE INVENTION

The present invention relates to communications networks, in general and, in particular, to point-to-point communication in next-generation mobile broadband wireless communication networks.

BACKGROUND OF THE INVENTION

Broadband wireless is expected to be one of the main drivers of the telecommunications industry. There is a substantial increase in demand for broadband connectivity, with personal broadband being the key growth engine for mobile wireless broadband networks.

Communication in such networks is generally divided between access and backhaul. An access network is the air interface network providing traffic communication between mobile terminals (subscribers) and their associated access points (base stations), while a backhaul network is the air interface network providing traffic communication between the various base stations and a core network. The networks may be arranged to transfer data alone, as in Wi-Fi networks, or may be arranged for triple play services video, audio and data), typically WiMax (or other competitive technology, such as 3GPP-LTE). In conventional systems, the access network and the backhaul network each require their own separate transmission equipment, antennas, etc. at great cost to the operator.

One example of a conventional backhaul network is connecting wireless base stations to corresponding core mobile networks (ASN GateWay, AAA servers, etc). The choice of backhaul technology must take into account such parameters as capacity, cost and coverage. Base station backhaul typically is performed via wired infrastructure (e.g., E1/T1 leased lines), or via wireless Point-to-point (PTP) microwave links to each base station, which is expensive to deploy (equipment and installation). In particular, due to the direct, uninterrupted line-of-sight requirements of the wireless backhaul equipment, the backhaul components of conventional base stations require strategic deployment location on high and expensive towers.

Mobile WiMAX, as defined in IEEE Standard 802.16e-2005 Standardization for WiMAX, was originally designed to provide mobile broadband access for mobile devices, i.e., broadband wireless data-optimized technology, providing carrier-grade triple play services using a variety of user devices (such as laptops, PDAs, handheld devices, smart phones, etc.). A complete mobile WiMAX Radio Access Network (RAN) requires deployment of massive infrastructure, including base station sites with high towers, base station equipment, antennas, and a separate backhaul network, as described above.

The traditional approach for mobile WiMAX network infrastructure deployment is similar to that of cellular phone networks. The network is based on macro-cell deployment, that is, the base stations, radios and antennas are installed on top of high towers, transmitting at high power, so as to maximize the base station coverage area. In order to optimize the cost, the goal is to minimize the number of sites. This can be achieved by deploying more powerful base station equipment for increasing the cell range (e.g., high power radios, multiple radios on each sector with smart antenna techniques), resulting in more expensive base station equipment. However, for a broadband wireless network deployment, this approach is adequate mainly for the coverage phase, when a relatively small number of subscribers share the cell capacity. As the cell coverage area is large, covering a large number of potential subscribers, additional subscribers in each area can rapidly be blocked due to limited base-station capacity.

One proposal for increasing the traffic capacity of the base station, while not greatly increasing the interference caused with neighboring cells, is to use several directional antennae on a base station, each pointing in a different direction. In this way, it is possible to "sectorize" the base station so that several different sectors are served from the same location. (In any given direction, only a small number of frequencies are utilized). However, directional antennas are relatively expensive.

There are also known outdoor Wi-Fi networks, deployed mainly according to outdoor Wi-Fi mesh technology. The typical Wi-Fi setup contains one or more Access Points (APs), which is the equivalent terminology to Base Station in WiMax, having relatively limited range, deployed along telephone poles, street poles, electricity poles and rooftops. Due to the access point unit's smaller coverage range, a large number of access point units are required to cover a given area. Conventional outdoor Wi-Fi access point units require costly power amplifiers in each Wi-Fi AP unit to extend the coverage range. In addition, conventional Wi-Fi networks operate only on unlicensed bands and suffer from severe interference and difficult radio-planning issues.

Furthermore, in the micro/pico-cell deployment approach of conventional Wi-Fi-mesh networks, due to multiple access point nodes in the network, backhauling becomes more complicated and costly. Backhauling each node via wired lines (E1/T1 or DSL) is impractical in a dense deployment of nodes. On the other hand, backhauling each node via traditional wireless PTP microwave links is expensive due to costly equipment and installation costs and not feasible to deploy on telephone poles, street poles, electricity poles, etc. In Wi-Fi, like in WiMAX, PTP microwave links require high towers to achieve a clear line-of-sight between nodes. In addition, when the network load is increased, the backhaul network losses drastically degrade the overall network performance (capacity and latency).

In traditional Point-to-Point (PTP) microwave backhaul operating in licensed bands or using unlicensed bands, OFDM (Orthogonal Frequency Division Multiplexing) or single carrier technology (constant power with a fixed modulation scheme) are typically employed. In OFDM, the channel bandwidth is divided into multiple concurrent parallel transmissions on several frequencies. However, during each time slot, there must be transmission over every frequency in the bandwidth. Thus, there is no granulation to permit correction of local interference, and, if there is a problem with transmission on one frequency, the entire transmission can be lost due to lack of frequency diversity, so the Signal to Noise Ratio (SNR) of a link (between two base stations) falls on the entire link.

Consequently, there is a long felt need for a wireless mobile broadband network that is relatively low in cost and provides an in-band backhaul network having interference mitigation.

In particular, it would be useful to have such a network with improved PTP communication having high frequency diversity, variable modulation and coding, MIMO and dynamically adapted Beam Forming, according to the instantaneous link conditions.

SUMMARY OF THE INVENTION

The present invention adds an additional layer of communication to conventional wireless networks by providing improved Point-to-Point (PTP) communication between nodes in wireless networks, as well as providing interference mitigation between various links in the network. The point to point communication system of the invention can be utilized for a broadband wireless backhaul interconnection between access point nodes in the network. Thus, various nodes can communicate with one another, and not only with mobile subscribers or the core network, as in conventional networks. Each node can be an access point, a base station, a relay station, or any other infrastructure element which supports wireless infrastructure to infrastructure communication in a wireless network, and these terms will be used interchangeably in this application.

In particular, this communication system is suitable for use in next-generation mobile broadband wireless networks deployed like Wi-Fi or WiMax networks. Each node preferably includes a single controller (typically a MAC controller) for controlling and coordinating both access and backhaul communications in the node. A conventional backhaul network, preferably a wired network, may be utilized to provide backhaul between the core network and each feeder node, which manages a cluster of nodes and distributes the traffic between the various nodes within the cluster.

According to a preferred embodiment, the method and system of the invention involve the use of an antenna array arrangement of multiple omni-directional antennas in each node, one coupled to each modem, each node being able to provide multiple concurrent transmissions over multiple antennas, for example, MIMO (Multiple In Multiple Out) for point-to-point transmissions over a single link, one to three MIMO streams being allocable among the various antennas in the array. Alternatively, a plurality of directional antennas can be utilized, and the number of MIMO streams will be defined in accordance with the number and beam width of the antennas. In this way, the present invention provides improved PTP communication having high frequency diversity, variable modulation, turbo or non-turbo coding, preferably using MIMO and dynamically adapted beam forming, according to the instantaneous radio link conditions (such as Signal to Noise Ratio) based on measurements performed over each single link and, when in a network, over a cluster of links (a plurality of nodes).

There is provided according to the present invention a system for point to point communication including at least two pairs of nodes arranged in a cluster and coupled for wireless communication, each pair forming a link, each node including at least one RF transceiver providing access communication and backhaul communication over the link, a modem coupled to each transceiver, an antenna array arrangement mounted in the node, one antenna coupled to each mode, the antenna array arrangement being arranged to provide multiple concurrent transmissions over multiple antennas, a controller in each node adapted and configured for control and coordination of the transceivers and associated modems, and an interference mitigation mechanism implemented by the controller to improve quality of transmission and minimize interference within the cluster during multiple concurrent transmissions.

According to one embodiment of the invention, the antennas are omni-directional antennas driven utilizing smart antenna techniques. According to an alternative embodiment of the invention, the antennas are directional antennas.

A number of mechanisms are available for such interference mitigation for the wireless PTP link, which are designed to maintain a CINR as high as possible in each link, so that the spectral efficiency of each link will remain high. For example, the interference mitigation mechanism can be selected from transmit power control, spatial beam coordination, sub-channel management (OFDMA), null steering, coding (CDMA), link coordination, radio resources re-use, fractional frequency re-use, among others, or any combination of the above.

There is also provided in accordance with the invention, a method for wireless communication including forming a plurality of nodes, each node including: at least one RF transceiver providing wireless point to point communication over the link; a modem coupled to each transceiver; an antenna array arrangement mounted in the node, one antenna coupled to each modem, the antenna array arrangement providing multiple concurrent transmissions over multiple antennas, each antenna having a beam pattern selected to improve quality of transmission; a controller in each node adapted and configured for control and coordination of the transceivers, modems and antenna array arrangement; and arranging at least two pairs of nodes in a cluster, each pair coupled to form a link for wireless point to point communication; allocating, by the controller, MIMO streams and modulation to different antennas in the antenna array arrangement; and providing at least one interference mitigation mechanism to be implemented by the controller to minimize interference within the cluster during multiple concurrent transmissions.

BRIEF DESCRIPTION OF THE DRAWINGS

The present invention will be further understood and appreciated from the following detailed description taken in conjunction with the drawings in which:

FIG. 5a is a schematic illustration of an antenna configuration according to one embodiment of the invention;

FIGS. 5b and 5c illustrate two embodiments of sectorization by the antenna configuration of FIG. 5a;

FIG. 5d is a schematic illustration of an antenna configuration according to an alternative embodiment of the invention;

FIG. 5e illustrates an embodiment of sectorization by the antenna configuration of FIG. 5d;

FIG. 7b is a schematic illustration of the spatial interference mitigation scheme according to FIG. 7a;

FIGS. 8a, 8b and 8c are schematic illustrations of transmissions at different times on the spatial interference mitigation scheme of FIG. 7a;

FIG. 10b is a graphical illustration of transmitter power, according to the embodiment of FIG. 10a;

FIG. 12b is a schematic illustration of a deployment of nodes in a cluster using the fractional frequency re-use scheme of FIG. 12a.

DETAILED DESCRIPTION OF THE INVENTION

Figures 1A, 1B:
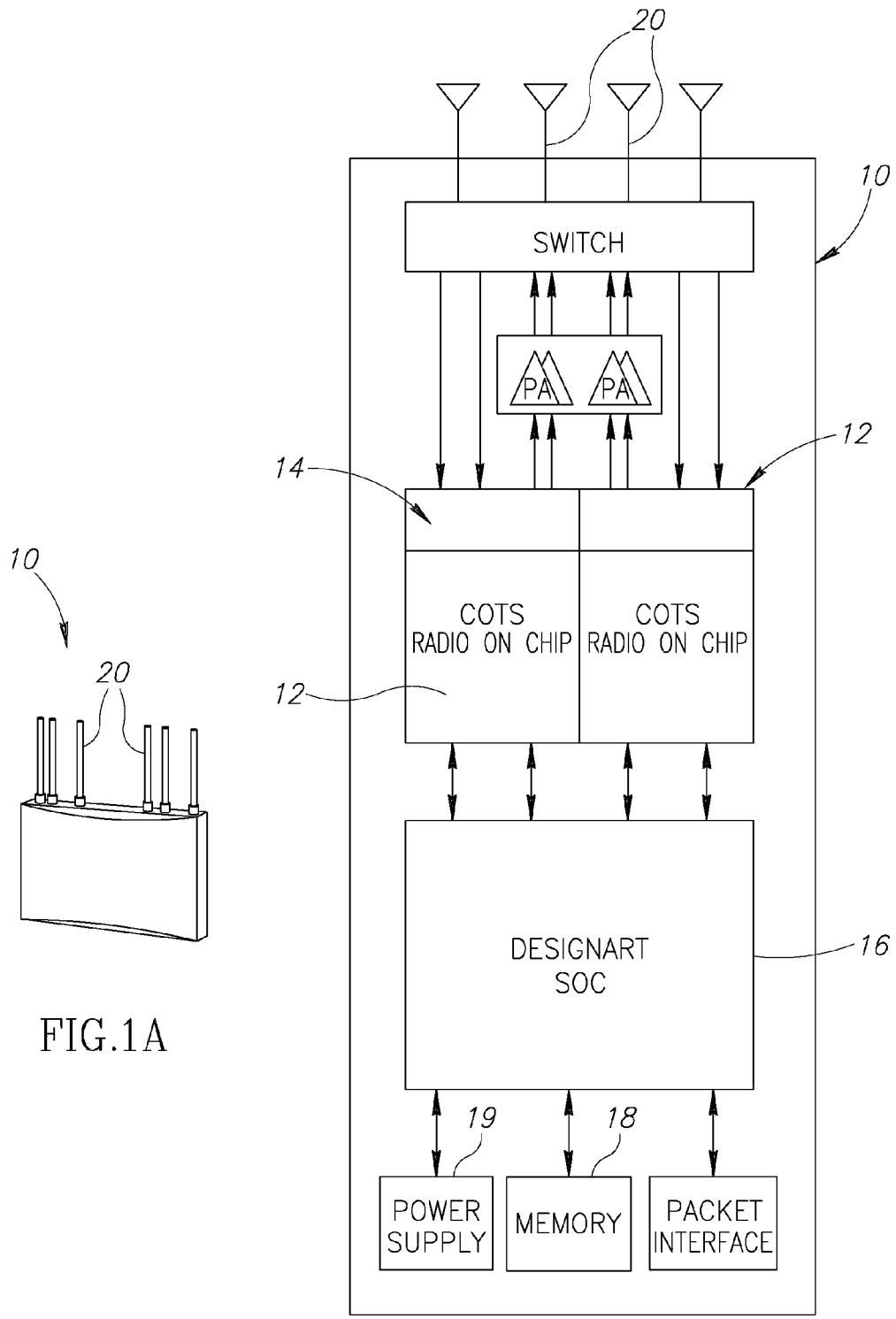
FIGS. 1a and 1b are respective plan view and sectional illustrations of a wireless next-generation mobile broadband node constructed and operative in accordance with one embodiment of the invention.

The present invention relates to a point-to-point communication system between wireless nodes in a wireless network, particularly a next-generation mobile broadband wireless network, serving as an access network or as an internal backhaul network between the various nodes, i.e., base stations, relay stations, access points, etc. For purposes of the present application, all the access and backhauling descriptions refer to any of these possibilities of infrastructure devices. In the discussion that follows, an access network is the air interface network providing communications between access points (base or relay stations) and mobile terminals, for example, as defined by IEEE802.16e-2005 standardization (WiMAX), and a backhaul network is the air interface network providing broadband wireless interconnection between access points within the network (and not traditional backhaul directly from each access point to the core).

According to one preferred embodiment of the invention, each node has a single controller for controlling and coordinating access and backhaul communication and for implementing the interference mitigation mechanisms. Preferably, equipment for both access communication and point to point (PTP) backhaul communication is built-in in a single module. Thus, no additional, external equipment is required for backhaul communication between access points, resulting in a "zero-cost" interconnection. The PTP communication operates over the same spectrum allocation (same frequency channel) that is used for access to the wireless subscriber terminals ("in-band" backhauling). This capability is particularly useful for deployments in licensed frequency bands, where the availability of extra spectrum for backhauling might impact the cost of deployment. With this solution, no additional separate frequency slice is required for the backhaul network, saving the costs of additional spectrum fees and frequency planning.

The present invention has aspects affecting two levels of a communication network—the link level, providing a high capacity link between two nodes, and at the network level, providing a 'backhaul network' utilizing interference mitigation between links which are operative concurrently, to significantly reduce disruptive interference. These two aspects will be described in detail below.

Each PTP link is a high capacity point-to-point link connecting one node in the network to another node, and in backhaul, for transferring its aggregated traffic towards the core network. The high capacity in the PTP link is achieved via methods of increasing the link spectral efficiency (transmitted bits/sec/Hz), although this compromises the link budget (maximum path loss with received transmission). Preferably, this is accomplished by performing high density modulation (QPSK to 256 QAM at present) and providing multiple concurrent transmissions over multiple antennas. According to one embodiment, multiple transmissions are provided by creating virtual groups of omni-directional antennas, each group creating a beam at a certain beam width and transmitting a single stream. In this way, the spectral efficiency can be increased using MIMO (Multiple In/Multiple Out) antenna techniques (adaptively allocating 1, 2 or 3 MIMO streams to different antennas) resulting in a PTP link with much higher spectral efficiency as compared to the average access network spectral efficiency. The link budget can be improved by using beam forming with the omni-directional antennas.

A particular feature of one embodiment of the present invention is that the access and backhaul are integrated into a single entity, and managed by a single Radio-PHY-MAC unit, utilizing the same resources (same antennas, radio and digital hardware, same spectrum or frequency bank, and MAC functionalities) for both access and backhaul, and manipulating both traffic types on a frame by frame basis. A single scheduler (software algorithm) manages the traffic allocation to both the access point and PTP link portions, allocating traffic on each frame to each mobile station or backhaul node in accordance with a set of operator configurations for Quality of Service (QoS), which enables tight control of packet delay, packet delay jitter and packet rates for both backhaul and access portions.

Referring now to FIGS. 1a and 1b, there are shown respective plan view and sectional illustrations of a wireless next-generation mobile broadband node 10, according to one embodiment of the invention, serving as an access point unit, base station, or relay station. Each node 10 includes at least one and, preferably, a plurality of RF transceivers 12 for access to mobile stations within its coverage range, as well as for the high capacity backhaul point-to-point (PTP) link for communication with other nodes in the network.

Each RF transceiver 12 is coupled to an antenna array arrangement 20. Preferably, antenna array arrangement 20 includes a plurality of omni-directional antennas, although alternatively, they can be directional antennas. A suitable modem is provided between each RF transceiver 12 and its associated antenna. In one embodiment, both access and backhaul are coordinated and synchronized by a single controller 16, here shown as a MAC controller, coupled to the transceivers, permitting utilization of the same hardware resources of the node, that is, the same radio, modem and antenna elements, for both access and backhaul. A memory 18 is provided for storing the various algorithms for operation of the node, as well as a power supply 19 to supply the low power (about 7 W) required by the node components. When utilized in a WiMAX system, node 10 acts as a standard Mobile WiMAX 802.16e base station for access to WiMAX subscribers within its coverage range, as well as for the wireless backhaul link.

While each access point unit may include 6, 9 or even 12 antennas, the access point unit 10 of the embodiment shown in FIGS. 1a and 1b incorporates six radio hardware chains, each of which transmits and receives RF signals to/from one of the six antennas in antenna array arrangement 20, and the modem transmits signals over the six antennas to perform sectorization via beam forming techniques or MIMO. In this way, six complete channels are formed for smart antenna manipulations, such as beam-forming, and antenna diversity schemes, such as maximum Ratio Combining or STC, thus gaining range extension, reduced fade margin and improved link performance in multi-path conditions. When using directional antennas, the direction and width of the beam are dictated by the antenna physical location and antenna characteristics. However, the use of omni-directional antennas permits later selection of beam characteristics by forming virtual antenna groups, using smart antenna techniques configurable by software.

Each node is based on low-cost, standard off-the-shelf radio transceivers with power amplifiers ("terminal RF-IC" modules), such as those used at present in mobile consumer terminals. According to a preferred embodiment, each node also includes a plurality of low-cost standard omni-directional antennas, preferably arranged in groups of 6, 9 or 12 antennas. Using these modules drastically reduces the cost of the node. Therefore, each unit is a low-cost, low-power and small-form-factor unit.

The low cost RF transceivers may be those typically utilized in WiMAX mobile station handset units, which are designed, architecturally, to transmit low power. Thus, the radio is typically zero IF architecture, which requires compensation of I/Q phase misbalancing, gain misbalancing and DC offset. Therefore, working with "low-end" radio transceivers in a next-generation mobile broadband wireless base station requires a unique modem (PHY) design to compensate for the radio limitations, to comply with the standard requirements for base stations, and to enable high capacity point to point broadband employing high modulation, such as 64, 128 or 256 linear QAM modulation. In addition, phase noise should be filtered out in the receiver by a phase loop developed in the base band modem part, to increase the link immunity to the phase noise inherent in low cost radio transceivers. Furthermore, a large dynamic range is required to support concurrent near and far user transmissions in the base station uplink mode of operation, which is not a typical requirement of a receiver operating in mobile station mode. This is desirable since closer transmissions will be stronger than far transmissions, but all transmissions should be concurrently decoded without any power control incorporated within the receiver. This dynamic range requirement can be improved by using a large bit analog to digital (A/D) converter and/or by increasing the sampling frequency, which decreases quantization noise by decimating the signal and filtering it.

In addition, due to the problem of high transmission of out-of-band noise inherent in the low cost direct conversion radio existing in the mobile station unit, transmission power preferably is limited to the low power utilized in the mobile station. (Beam forming techniques can be used later to improve coverage or link budget by enhancing the power transmitted by the unit).

The receiver side of each access point node in the network preferably provides adaptive allocation of not only MIMO streams, but also of modulation and coding, as described below.

If desired, due to the fact that the PTP backhaul link will experience a high CINR, a backhaul coding scheme, which is not in used in IEEE 802.16e, can be used in addition to convolutional code and convolutional turbo code. A block turbo code or product turbo code, which is adapted to high SNR or CINR and high capacity (low latency iterative decoding), can optionally be used for backhaul PTP coding, particularly at higher modulations. This, theoretically, will increase coding gain of about 2 db at 25 db CINR link condition.

It will be appreciated that rate optimization can be provided, while compromising the extra range, by using higher modulation, preferably 128-256 QAM, in the PTP link, and by using MIMO, preferably 1 stream to 3 streams, to increase the rate in the PTP link. Furthermore, the rate in the PTP link is adaptive—it can be adapted according to the link conditions (SNR or CINR, BER or any other interference estimation) to achieve up to 256 QAM modulations. Adaptation of modulation can vary between QPSK, 16 QAM, 64 QAM, 128 QAM and 256 QAM, with the optimal modulation being selected in accordance with a pre-defined modulation adaptation scheme.

Figure 2:
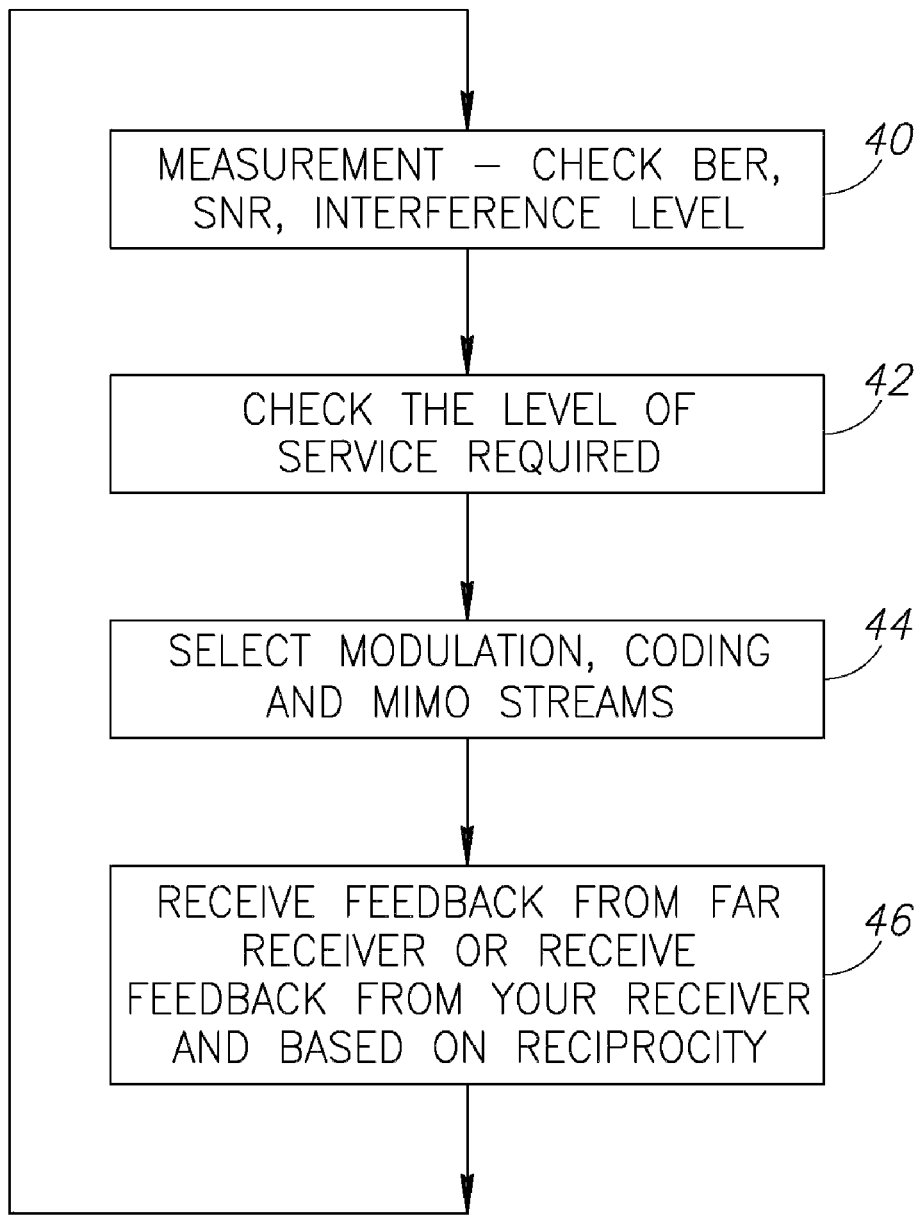
FIG. 2 a flow chart of a link adaptation process according to one embodiment of the invention

Adaptation of MIMO streams and modulation are interrelated and preferably are jointly determined. The adaptation of the modulation, coding and MIMO streams is based on the link SNR, level of interference and Bit Error Rate experienced within the link. See, for example, FIG. 2, a flow chart of a link adaptation process according to one embodiment of the invention, carried out by the MAC controller. As illustrated, each node sends a CQI (Channel Quality Information) message over the link (block 40) and receives the CQI message sent by the node connected to it (block 46). The CQI message can carry information on CINR on each remote antenna (block 40), e.g., effective CINR sampled by the remote receiver after the multiple antenna demodulating processing, received BER (Bit Error Rate) or BLER (Block Error Rate), received RSSI on each remote antenna, effective RSSI sampled by the remote receiver after the multiple antenna demodulating processing, and/or any additional link level estimator providing information on the link quality, due to signal attenuation or interference (block 40). In an alternative embodiment, the CQI information of each link side receiver is used to adapt the modulation of the link in its transmission by using channel and interference reciprocity. This will reduce complexity (no need for feedback), but also reduces the link adaptation performance.

The level of service required for the link (stored in the memory) is now checked (block 142) and, in accordance to pre-defined schemes, the modulation, coding and number of MIMO streams are selected (block 44), based on the measured and reported CQI data. In one embodiment of the invention, a possible adaptation scheme (modulation, coding, MIMO) is described below:

Each node reports to the remote node its CQI over a robust link over the air.

Each CQI is received from the remote node and reported to the controller.

The controller adapts the modulation, coding and MIMO streams allocation over the link based on pre-defined CINR required per modulation and MIMO scheme. Alternatively, the CQI can provide information regarding the MIMO streams spatial separation of this specific link. This determines the capabilities of this link to operate in MIMO. If it is capable, MIMO will be enabled on this link. If not, beam forming will be explored on both sides of the link.

After the controller adapts the modulation, coding and MIMO streams over the link, it will track the link conditions by monitoring the CQI from the remote link, such as BER or BLER. In case a high BLER or BER is observed, the controller will iteratively decrease the modulation, increase coding and de-allocate MIMO streams until a pre-selected required BER is obtained. (It will be appreciated that it is not correct to look only at the BER of the node's receiver, due to different interference patterns at the two ends of the link.)

The discussion above relates to the link level, between two nodes. When forming a network, each node is deployed in a cluster with several other nodes. While the PTP system of the present invention can be used with any wireless technology, it is particularly useful in applicants' novel WiMAX network as part of the WiMAX integrated backhaul, described in detail in applicant's co-pending patent application entitled WiMAX ACCESS POINT NETWORK WITH BACKHAUL TECHNOLOGY. Other examples of such technologies, where the air interface is not WiMAX, include WiFi, 3GPP LTE, GSM, etc. The present invention will now be described with regard to such a network, with specific reference to WiMAX by way of non-limiting example, only.

Figure 3:
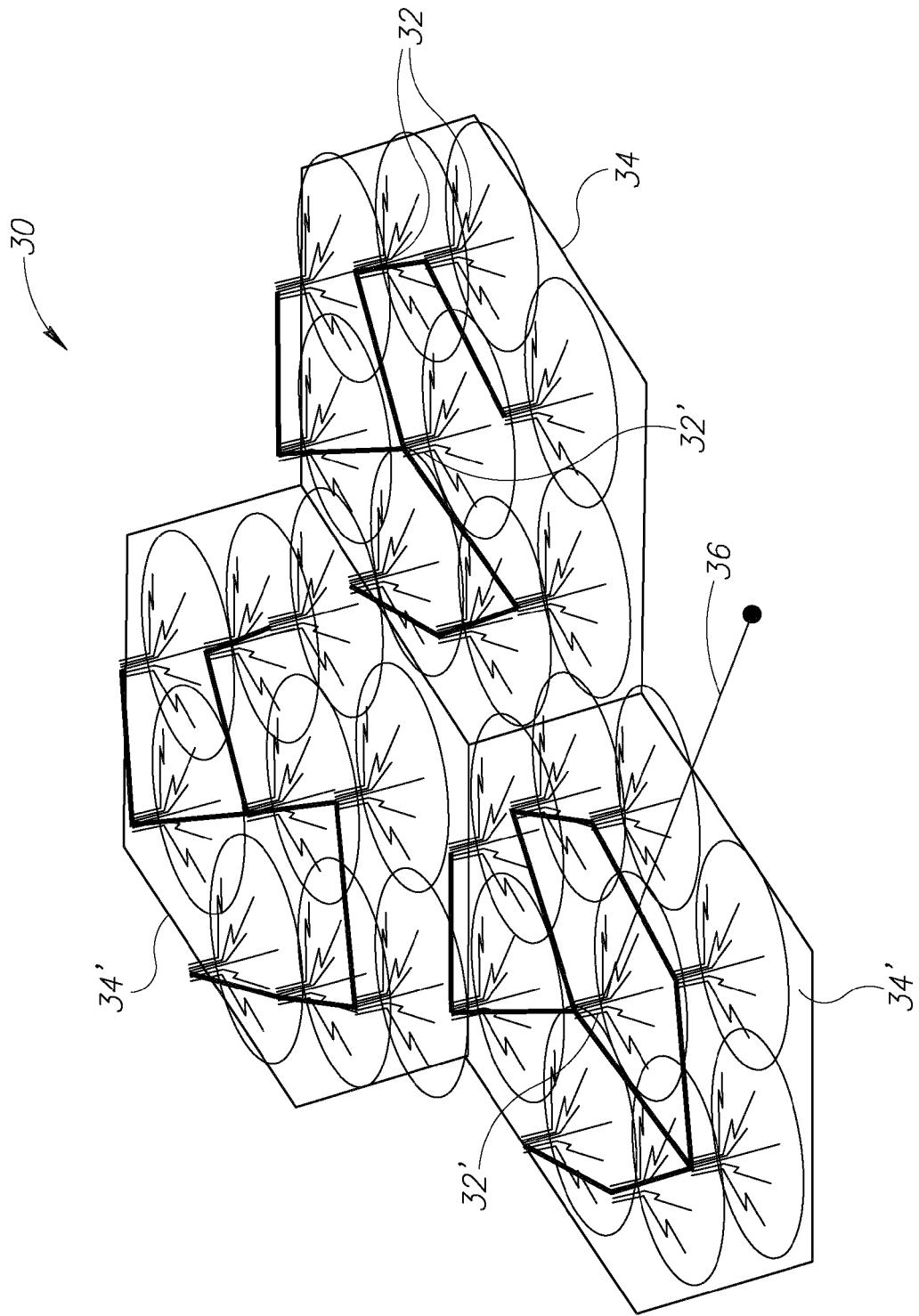
FIG. 3 is a schematic illustration of a wireless network constructed and operative in accordance with one embodiment of the present invention.

Referring to FIG. 3, there is shown one example of a next-generation mobile broadband wireless network 30 according to the present invention. The network 30 includes a plurality of access point nodes 32, substantially similar to nodes 10 described above, each of which acts as a base station for its cell. As states above, for purposes of the present application, the term access point unit, node, base station and relay station are interchangeable. Deployment coverage is provided by a network of base stations, which is logically divided to multiple clusters 34, 34' (defined as a logically connected group of base stations). Each cluster 34 is formed of a group of access point nodes 32 wirelessly interconnected to each other (as shown in heavy black lines), each of which provides wireless access to part of the cluster.

In each cluster, one access point coordinates all the access points within the cluster and manages the backhaul network interference-mitigation scheme. This access point is referred to as a feeder node. The feeder nodes 32' in each cluster are physically connected to the wired backhaul 36 and serve as the conventional backhaul connection point of the whole cluster 34 to the core network (not shown). Each node 32 provides access to wireless subscribers in its cell coverage area and communicates with at least one other node in the cluster, via the point-to-point communication of the invention, as described below. This communication can either be directly with the feeder node or via other node acting as a relay, to transfer its aggregated traffic towards the core network. Thus, the wireless infrastructure deployment according to the invention can include one or more relay stations which communicate with one or more base stations and enable enhancement of the coverage and the capacity of the cell.

The access point units 32 of FIG. 3 are deployed in micro-cell/pico-cell deployment configuration. Micro/pico cells are defined as relatively small cells (typically 300-400 m radius in dense urban areas, as an example) installed in outdoor sites, typically on street lamp posts, telephone or electric poles, and rooftops, etc., as known in conventional outdoor WiFi networks, as well as in indoor sites, for in-building coverage extension and extra capacity requirements in indoor locations.

Deployment topology of the access point units is preferably using a multi-hop relay topology, rather than macro-cell or mesh technology. This means that each mobile station is coupled to a core mobile network just by the feeder node, or by one or more relay nodes for data relay. Since each access point unit 32 includes built-in, Point to Point backhaul, only a single box need be installed in each location, which results in easy and low cost site preparation (no need for preparing conventional wired backhaul to each node, but only to one node in each cluster (the feeder node)) and a low-cost installation (single unit installation). In one embodiment of the invention, for indoor coverage deployment, the unit can be equipped with fewer antennas than are used for outdoor coverage.

Figure 4:
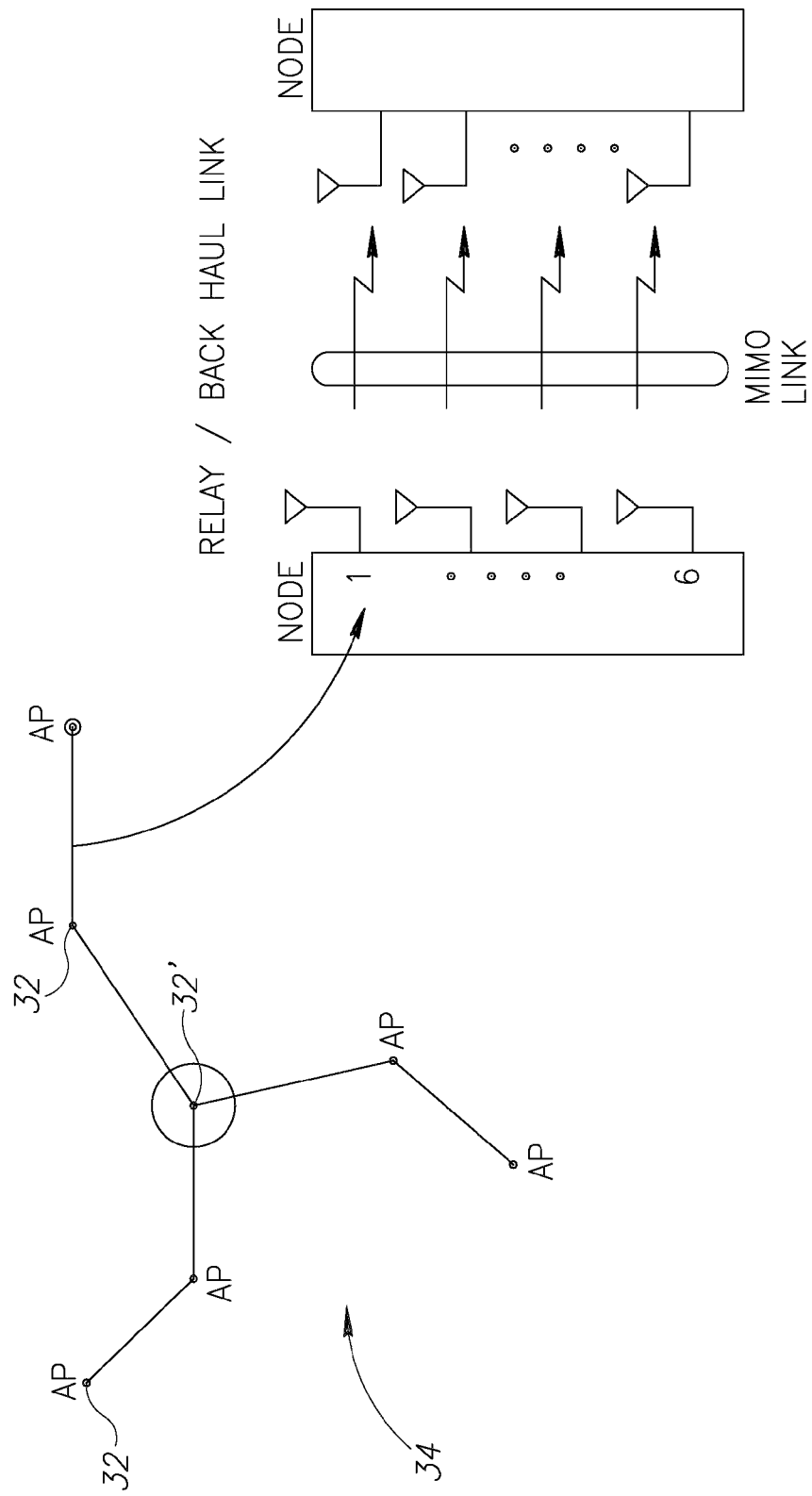
FIG. 4 is a schematic illustration of a deployment topology according to one embodiment of the invention, transmitting over a MIMO link.

The nodes in the cluster 34 of FIG. 3, in one embodiment, may be interconnected in a tree topology, the feeder node being the root of that tree, as illustrated schematically in FIG. 4. In the wireless network of the invention, the topology is preferably star, multi-hop or any combination of these two topologies. All traffic from all nodes 32 in the cluster is routed to and from the feeder node 32', and then to the wired Internet network. The path from each node communicating with the feeder node is known and static under given link and network conditions. Alternatively, routing can also adapt itself due to traffic load sharing between nodes, interference conditions, and other deployment issues.

When there is more than one link utilizing PTP communication according to the invention near one another, interference is likely to arise during concurrent transmission over spatially close links. By observing link conditions throughout the cluster, the feeder node self-learns the interference within the cluster on each backhaul link, and adaptively optimizes the cluster backhauling links to the network by tuning beam width, power, sub-carrier allocation and modulation. In order to collect information about link conditions, the feeder node periodically exercises the interference within the cluster. Interference exercising, in one embodiment, is carried out by allocating a pilot frequency within the channel bandwidth for interference management, uniquely for each link. Thus, a specific node has the capability to measure its unique link CQI and interference power on another link by measuring the power on the pilot of the adjacent link within the cluster and on adjacent clusters. (The feeder instructs some or all of the nodes to transmit, and receives feedback regarding quality of the received transmissions from its remote nodes and interference estimation of each node within the cluster impacting this link). The node then adapts all link parameters based on the interference, and load balancing.

In order to improve performance, interference mitigation is highly desirable. A number of mechanisms are available for such interference mitigation, particularly for the backhaul PTP link, which are designed to maintain a CINR as high as possible in each link, so that the spectral efficiency of each backhaul link will remain high. These include, among others, transmitter power control, spatial beam coordination, sub-channel management (OFDMA), as well as null steering, coding (CDMA), link coordination, and fractional frequency re-use, which will be explained in detail below. It will be appreciated that the MAC processor performs all interference mechanisms, both in the feeder and in each link.

Formation of virtual antenna groups, according to one embodiment of the invention, will now be described. A bit stream (data or symbols) to be transmitted can be transmitted over a link by all the antennas in the node or by sub-groups of antennas (e.g., 2, 3 or 6, depending on the total number of antennas in the node). As known, transmission of the same stream (1 stream) over all the antennas will improve the SNR, and the spectral efficiency will increase in proportion to the improvement in SNR. However, if the bit stream can be split into two or more MIMO streams by the modem (PHY) in the node, then the rate can be doubled (or higher) by transmitting more than one symbol on the same frequency at the same time. This, of course, will reduce the link budget per stream, which will reduce the SNR per stream.

Each MIMO stream is allocated an appropriate grouping of antennas, according to the network and/or the link configuration. Transmitting multiple streams can be accomplished when the streams are spatially separated. This separation can be gained by physical geometry separation between antennas or by rich scattering contributed by the channel, or where the streams are separated by polarization of the electromagnetic fields of the antennas, such that each stream has a different polarization, or by any other means of parallelization of the streams within predefined channels. Thus, the capacity can be increased by a factor of the number of streams since, when utilizing MIMO techniques, each receiving antenna can cancel adjacent stream interference, so as to properly receive the stream that was directed to it.

One proposed antenna configuration, illustrated schematically in FIG. 5a, involves allocating antennas to create two groups 40, 42 of antennas, each having three omni-directional antennas arranged in a triangle (as shown in hardware in FIG. 1a). As seen in FIG. 5a, the antenna groups 40 and 42 are spatially separated, with the distance d between antennas in each group typically being lambda/2, with distance L between two groups, typically >5 lambda. Alternatively, two groups of three omni-antennas can be utilized at smaller spatial distances, i.e. L<5 lambda, with polarization, i.e., -one group being vertically polarized and the second being horizontally polarized, as when there is a 90° mechanical angular spatial separation between the antennas.

In the configuration of FIG. 5a, each group of antennas generates three beams 44 (of 120° each) using beam-forming, as shown schematically in FIG. 5b. In addition, a diversity scheme between the two groups of antennas is preferably employed, using transmit and receive diversity methods, such as STC (Space Time Coding), CDD (Cyclic Delay Diversity), MRC (Maximum Ratio Combining), selection diversity, which provide enhancement of the link budget, resulting in increased SNR and increased spectral efficiency. These techniques can be used in either access or backhaul or both. Thus, the transmission can use one stream with one of the above diversity schemes, or two MIMO streams to enhance the capacity while sacrificing the link budget.

As seen in FIG. 5b, beams from six antennas can form three virtual sectors, where each virtual sector transmits and receives in a different frequency range. Beam-forming can also be used for sub-sectorization of each sector into two sub-sectors (additionally increasing the link budget), to provide essentially six sectors 46, as shown in FIG. 5c. This technique is useful, in access only, to increase link budget. Here, each sub-sector is 60° (360°/6), so each pair of beams forms a sector and uses the same frequency group. In this embodiment, it is important to note that in order to produce 6 sub-sectors with two streams in the same time, twelve antennas are required, six antennas for 60° sub-sector and six antennas for the additional stream. In FIG. 5c, the pairs forming each sector are illustrated as being adjacent to one another, but they are not limited to such configuration.

When there are two MIMO streams transmitted over six antennas, each stream transmitted to and from three antennas, the beam width can be 360/3 or 120°. Thus, in this case, the rate is twice the rate of one stream and the spectral efficiency is twice that of one stream. However, the beam is wider, causing the link budget to go down.

Similarly, where three MIMO streams are transmitted over six antennas, each stream is transmitted to and from two antennas at a beam width of 360/2 or 180°, resulting in three times the spectral efficiency but much lower link budget and more difficult reception. This option requires an antenna configuration of three pairs of antennas (not illustrated).

To sum up, a number of possibilities could exist for each MIMO stream, depending on the configuration of the antennas and antenna beam-width. Each antenna can be arranged for 1, 2 or 3 MIMO streams having beam widths as follows, when using omni-directional antennas:

| | | |
|---|---|---|
| 6 antennas: | 1 stream | 60° |
| | 2 streams | 120° |
| | 3 streams | 180° |
| 9 antennas: | 1 stream | 40° |
| | 2 streams | 80° |
| | 3 streams | 120° |
| 12 antennas: | 1 stream | 30° |
| | 2 streams | 60° |
| | 3 streams | 90° |

An alternative proposed configuration is 6 antennas 48 arranged in a circle, as shown in FIG. 5d. With this configuration, two beams 49 of 60° are generated by the six antennas. Only beam forming for single transmissions or SDMA for multiple concurrent transmissions (described in detail below) can be utilized. (Since these antennas are not sufficiently separated spatially, MIMO cannot be utilized.)

Another alternative embodiment is to utilize a plurality of directional antennas. For example, using directional antennas of 90° each, the angle of each antenna should be 90° divided by the number of antennas times the number of streams.

Although the number of antennas is configurable (i.e., selected in advance and fixed in the hardware), the number of streams preferably is dynamic and adaptive, and is adjusted over time. Preferably, 1, 2 or 3 MIMO streams are adaptively allocated to different antennas, depending on measured link conditions, and the bandwidth beam pattern (from 180 degrees to 60 degrees) is selected to improve link budget. Thus, the number of streams is selected depending on the amount of interference, noise, signal strength (RSSI), CINR (Carrier to Interference and Noise Ratio), etc., at any given time along the link. Accordingly, the number of streams can change periodically, although not necessarily in real time.

The receiver side of each access point node in the network preferably provides statistical information to the transmitter in the other node on its link required in order to permit adaptive allocation of not only MIMO streams, but also of modulation and coding, as described below.

Spatial beam coordination provides interference-mitigation by sharing radio resources using the beam-forming mechanism, described above with regard to the beam width of multiple MIMO streams. Beam forming or beam steering can be used to synchronize in space and time the backhaul accessing of the network by each node. Spatial beam coordination allows control of the direction of the RF beam to other links in non-interfering geographical locations. It will be appreciated that this option is available only when using omni-directional antennas.

Another preferred method of interference mitigation is sub-channel management, which permits allocation of a part of the frequency channel bandwidth to a certain backhaul link and a different part of the frequency channel bandwidth to other backhaul links. According to this mechanism, the modem and controller provide orthogonal frequency division multiple access (OFDMA) for data transmitted over the link, preferably adaptively selecting 64 to 1024 FFT OFDMA, which enables high granularity in bandwidth allocation to each link, and modulation according to the channel conditions. Higher modulations, i.e., 512 or 1024 or 2048 FFT modulation, improve the robustness of the link to multi-path. According to the invention, OFDMA permits allocation of portions of time and frequency to different links. By dividing the channel into sub-channels by time and frequency, different links in the same geographical area can transmit at the same time over a different frequency sub-channels, or over the same frequency sub-channels at a different time, without interfering with each other. Thus, both time and frequency diversity of the channels and frequency diversity gain are provided. This results in time and frequency granulation, which permits low penalty cost (in term of resources time/ frequency), in case local frequency interference is detected.

Figure 6:
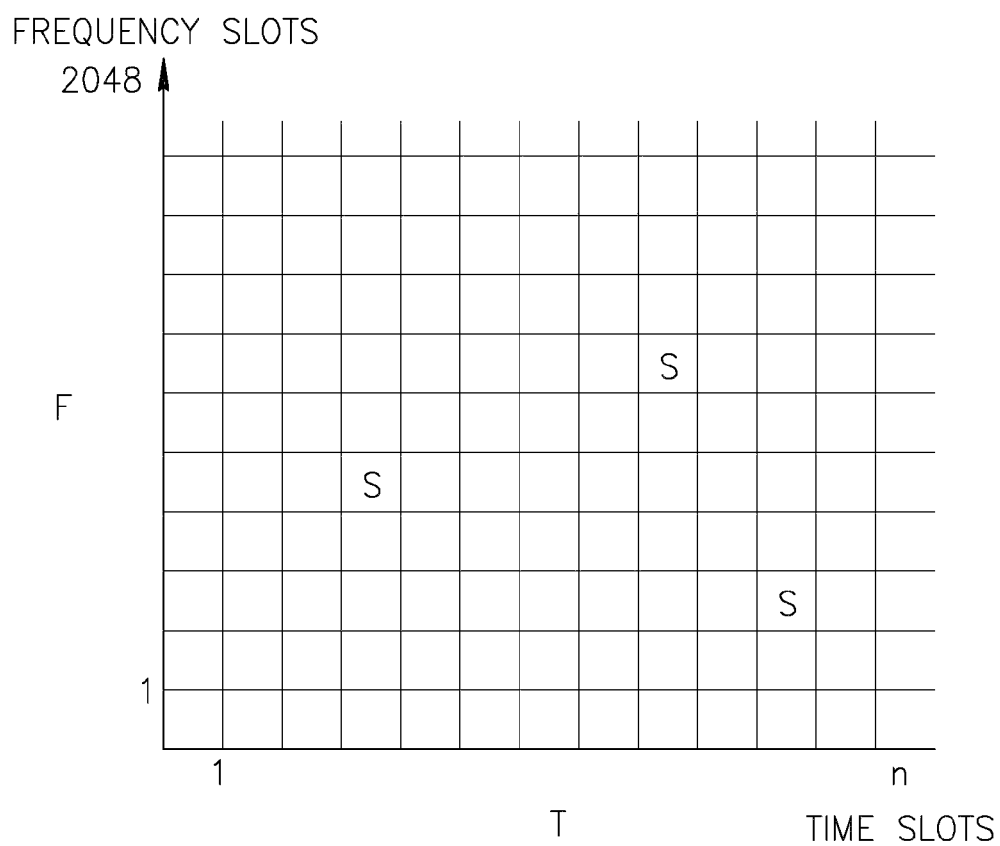
FIG. 6 illustrates a time and frequency allocation plan according to one embodiment of the invention.

A time and frequency allocation plan according to one embodiment of the invention is illustrated schematically in FIG. 6. As can be seen, the available time T is divided into n slots, while the frequency F is divided into up to 2048 frequency slots. Each link is allocated one or several, contiguous or non contiguous allocations of these time/frequency slots S. In this OFDMA allocation scheme, different data can be loaded on each frequency/time slot (defined as bins), enabling full frequency and time diversity. In this way, source information can be dynamically transmitted over different sub-channels with different power levels, modulation and coding schemes, and at different time and frequency allocations on different MIMO streams on each link.

In one embodiment of the invention, each link can utilize a different part of the spectrum or time to communicate with its remote link. The process of selecting which band to utilize on each link can be carried out in a centralized fashion. For example, the feeder node, according to interference reported by each node in the cluster, can produce an interference map indicating the interference caused by each link on the other links, and can coordinate the spectrum such that a link which suffers from interference will operate on a different frequency slice concurrently, or on a different time slice over the whole spectrum.

Yet another interference mitigation mechanism is known as null steering. Null steering involves adjustment of the beam pattern whereby the spatial arrangement of the beam at least partially cancels the effect of transmission of a certain link in the direction of another link. This technique is known in the art and can be used together with, or instead of, alternative methods of interference mitigation described herein.

Another method of minimizing interference is encoding the transmission (CDMA). One suitable method is to allocate to each link a code from the family of Walsh-Hadamard codes, although any other CDMA code can, alternatively, be employed. By multiplying each link data symbol by one of the orthonormal codes (+/−1 value) of a Walsh sequence code from a family of Walsh-Hadamard codes, each link can transmit when it has data to transmit. The interference in demodulation of data from one link to another will be spread and flattened, which will make it easier to measure average burst interference over the whole demodulation period and provide better BER or BLER performance due to white noise.

The feeder node in each cluster allocates codes to each link in its cluster. Thus, a unique CDMA code is allocated to each link, such that better concurrent performance and interference flattening can be achieved within each cluster (or multiple cluster, in case coding is managed by the operator). It will be appreciated that this method can be used together with, or instead of, any other PTP interference mitigation method.

According to one preferred embodiment of the present invention, the nodes according to the invention take advantage of radio resources re-use, a method of providing spatial interference mitigation, made possible by the fact that the feeder node within each cluster is aware of the interference on each link in its cluster. Thus, geographically separated PTP links can use the same radio resources, at the same time, for concurrent transmissions on the same radio frequency channel (slice), without creating interference, even without requiring coding or interference management methods. This is made possible by the following four characteristics of this embodiment: that the links are geographically separated; that beam forming is used to provide directional beams (60° or 120°, depending on the antenna configuration); that the feeder centrally manages the cluster and is aware at any given time of the total interference acting on the various links; and due to the typical deployment below roof-top level, resulting in isolation due to building penetration between access points (or relays). In this way, the level of interference between links far away on different roads will be lower, on average, than in the case of transmission above roof level. Furthermore, the network enjoys improved capacity: multiple transmissions provide multiplexing gain, which increases capacity be several factors.

The frame structure of the communication channel between base station and mobile station and between base station and base station can be divided in the time domain. One example is illustrated schematically in FIG. 7a. During each of three time slots T1, T2, T3, a feeder node A, coupled to a core network, communicates over a link with one of the access points B1, B3, B5, each of which communicates with one or more mobile stations. At the same time, one of the second hop (tier 2) access points B4, B2, B6, which communicates with the feeder node A through another access point, can communicate with its adjacent access point. In the example of FIG. 7a, B5 communicates with B4, at the same time as A communicates with B1, during time T1. This is possible due to the network characteristics set forth above, so that little or no interference is measured in the coupling of these two links.

Figure 7B:
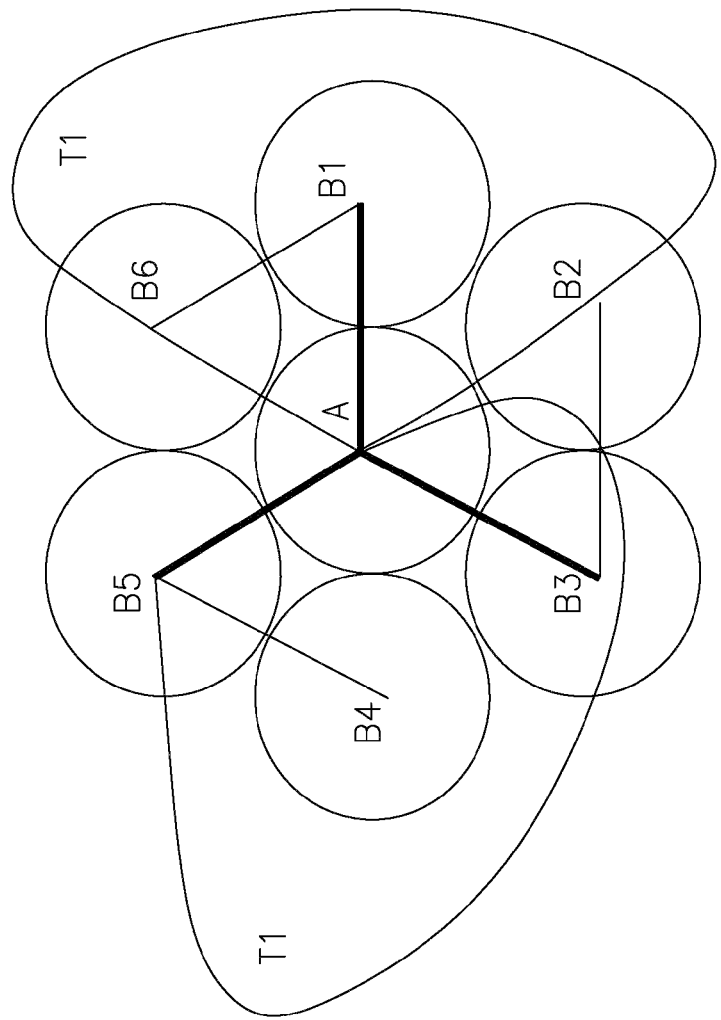
Figure 7A:
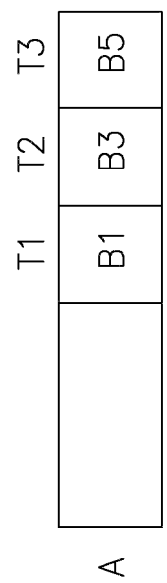
FIG. 7a illustrates a time division frame arrangement using a spatial interference mitigation scheme for an access point, according to one embodiment of the invention.
Figure 8A:
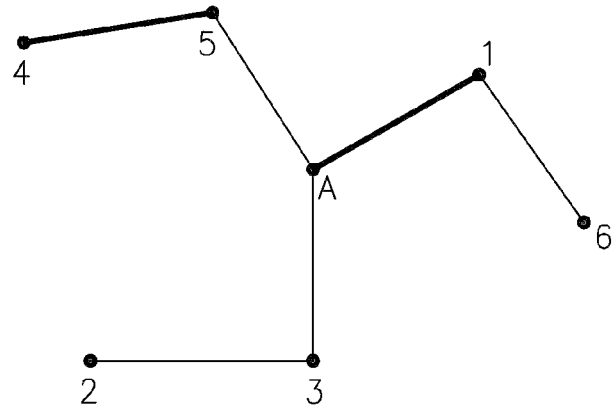
Figure 8B:
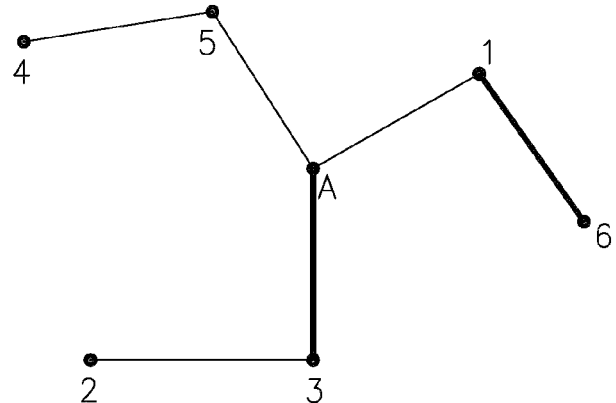
Figure 8C:
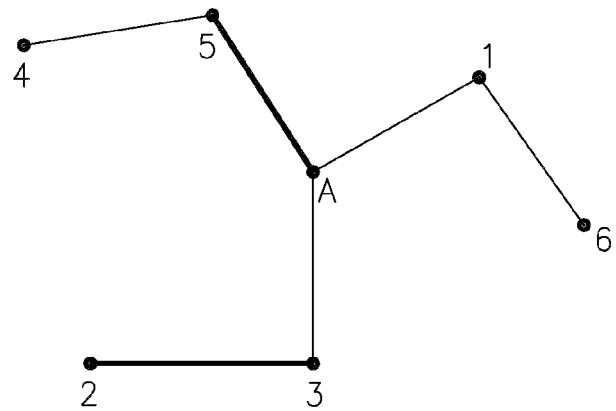

As can be seen schematically in FIG. 7b, beam forming has provided two substantially triangular coverage areas during time T1, which substantially do not interfere with one another. The groups of links having transmission at any given time can change, as set forth in FIG. 7a and illustrated schematically, as an additional example, in FIGS. 8a, 8b and 8c, the highlighted links being operative concurrently. In FIG. 8a, PTP transmission is illustrated as occurring concurrently between feeder node A and relay 1, and between access points 5 and 4. During a different time slot, as shown in FIG. 8b, PTP transmission occurs concurrently between feeder A and relay 3, and between access points 1 and 6, and during a third time slot, as shown in FIG. 8c, PTP transmission occurs concurrently between feeder A and relay 5, and between access points 3 and 2. This occurs due to the fact that these backhaul links are geographically separated, etc., as set forth above. Thus, they can fully reuse the radio resources in each time slot.

Figure 9:
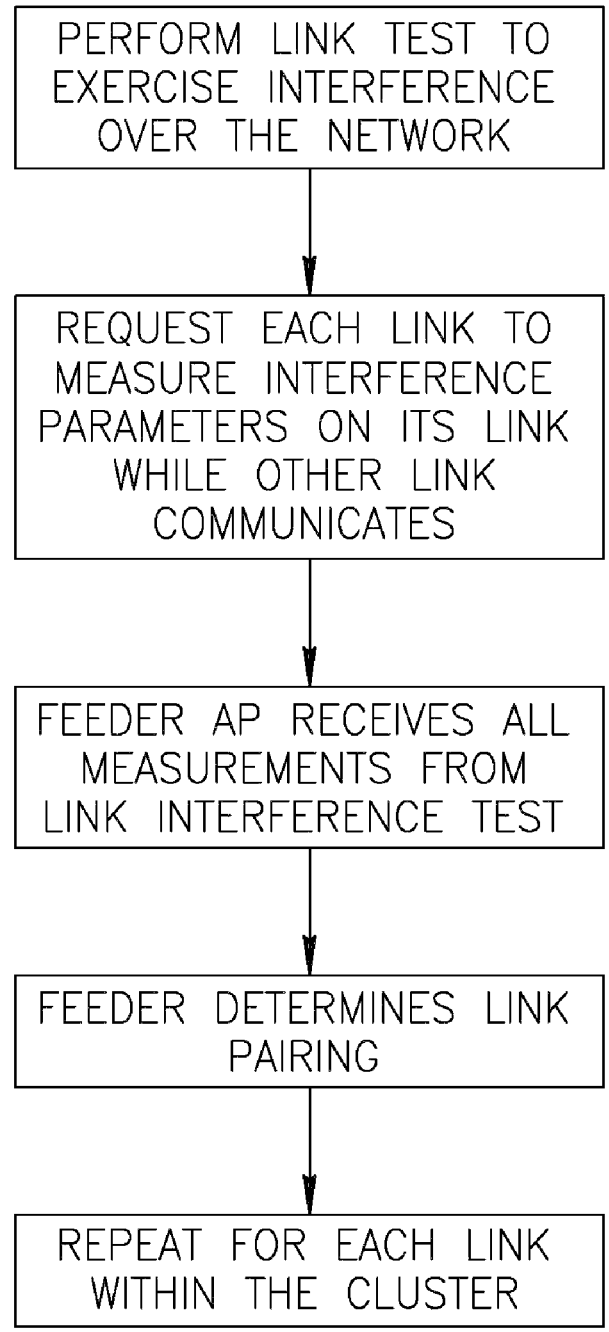
FIG. 9 is a flow chart illustrating radio resources re-use management, according to one embodiment of the invention.

The feeder access point is responsible for the allocation of radio resources among all the access points in its cluster. A suitable software algorithm permits the feeder to perform this allocation. A flow chart of one example of a suitable protocol for such radio resources re-use is shown in FIG. 9. First, a link test is performed on one link in the cluster, while all the links in the cluster are working, to permit measurement of the interference over that link (block 50). For purposes of the test, each link in the cluster is requested to measure pre-selected link characteristics during transmission/reception by the tested link, for example, interference parameters, CINR, SNR, BER or BLER (block 52). The results of these measurements are sent to the associated feeder node in the cluster (block 54). Based on these results, in accordance with pre-defined rules, a software algorithm running in the feeder determines the optimum link pairing (block 56) under the present network link conditions (i.e., which link transmits together with which other link), changing the current arrangement as necessary. This procedure is repeated for each link within the cluster (block 58). Alternatively, the feeder can request operation of certain links in the cluster, while measuring on one or more links, in order to determine the optimum link pairing. Based upon the results, the feeder may determine that an access point should be reconnected in a different manner to the feeder and/or may provide a different route for one or more access points in order to maximize capacity due to this radio resources re-use.

In one embodiment of the invention, multiple access transmission can occur concurrently with backhauling transmission on access points which are not participating in the backhauling transmission at a certain time. This is accomplished by utilizing beam forming in the antennas in the backhauling process, which will strongly attenuate access transmission interference due to about 15 db front back attenuation and geographical separation of access points transmitting access from the access points with backhaul transmission. In another embodiment, while a backhauling transmission takes place, no multiple access occurs within the cluster. This will completely eliminate access-to-backhaul interference but at the cost of total cluster throughput, since less time is available for access.

Referring, again, to the exemplary wireless network, modulation over the various links in a network can be of any suitable type, from QPSK to 256 QAM (at present), as described above for a single link. In addition, the allocation is adaptive, and changes depending on the state of network interference and the change of link conditions, as described above. Each link is managed by its associated feeder node, which acts as a central management point. The feeder determines the interference mapping of the whole cluster. By receiving transmissions from surrounding access points on its spectrum, the feeder node learns the pattern of noise of all the streams (self-learning) and, according to the pattern, allocates physical layer PTP parameters, such as modulation, coding rate, antenna beam-width (60° to 180°), number of MIMO streams (1-3), and time and frequency slots to be transmitted on, in order to allocate the best mode and stream configuration to provide maximum capacity on the link. Each configuration has its own corresponding SNR and rate. This is preferably carried out on a frame by frame basis, e.g., every 5 milliseconds.

Transmitter power control (TPC) is useful to permit reduction of the transmitter power, during backhaul transmission, to the minimum required in order for the receiver to receive the transmission with acceptable BER or BLER at the particular required CINR. The power control process is divided into two main phases, the first carried out on the link level, to adjust the power control on each link, and the second carried out by the feeder to adjust the power control on each link, in order to reduce interference on other links.

Generally speaking, the first phase of TPC is providing a target CINR (which is configurable) for each node. During communication, each node measures the CINR in its receiver and reports to its remote node the CINR it measured. The actual measured CINR is compared to the target CINR, and the transmission power altered, if necessary, in an effort to move towards the target CINR. The remote node will increase or decrease its transmission power, accordingly. As a consequence, the CINR in the near link will increase, decrease or remain without any change. This CINR will be reported to the remote node and it will decide to increase, decrease or maintain the transmission power, according to the CINR change. The remote node will increase its transmitter power only if the CINR increases after increasing the power. Otherwise, it will maintain or decrease the power. The decision to decrease or retain the power is dependent on the CINR change rate due to the power change—if no change in CINR occurs, the transmitter power remains constant.

In some cases, when there is a lot of interference over the link due to high power transmissions geographically close to the receiver, even increasing the power will not enable the receiver to receive the transmission. In such cases (i.e., where increasing the power does not improve the CINR), the lowest power that maintains the CINR unchanged is the optimal transmission power for the link under adjacent link conditions in the cluster.

Figure 10A:
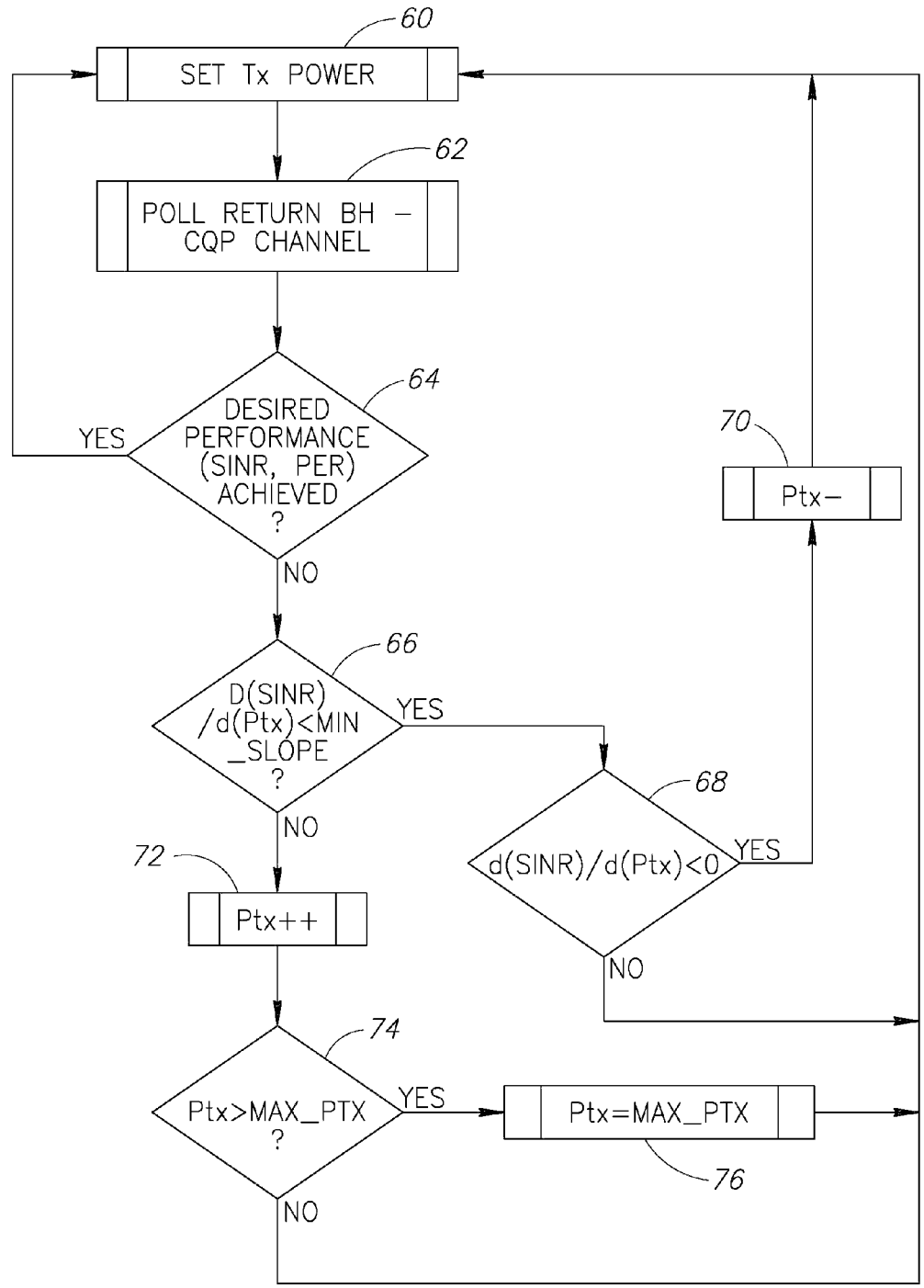
FIG. 10a is a flow chart illustrating transmitter power control, according to one embodiment of the invention.

Referring now to FIG. 10*a*, there is shown a flow chart of one method of setting the transmitter power in a certain link.

One link begins this process by setting an estimated Transmit power (block 60) which, in one embodiment, can be extracted from the Receive Signal Strength Indication (RSSI) on this link.

Then the transmitting node of the link polls feedback CQI (returning backhaul CQR) (block 62). In one embodiment, this is the CINR measured in the remote receiver on the communication link.

In case the required CINR is reached (block 64), the power is maintained and the link is periodically monitored to ensure maintenance of the CINR within a predefined tolerance or window of CINR—called "hysteresis", as known in the art.

Figure 10B:
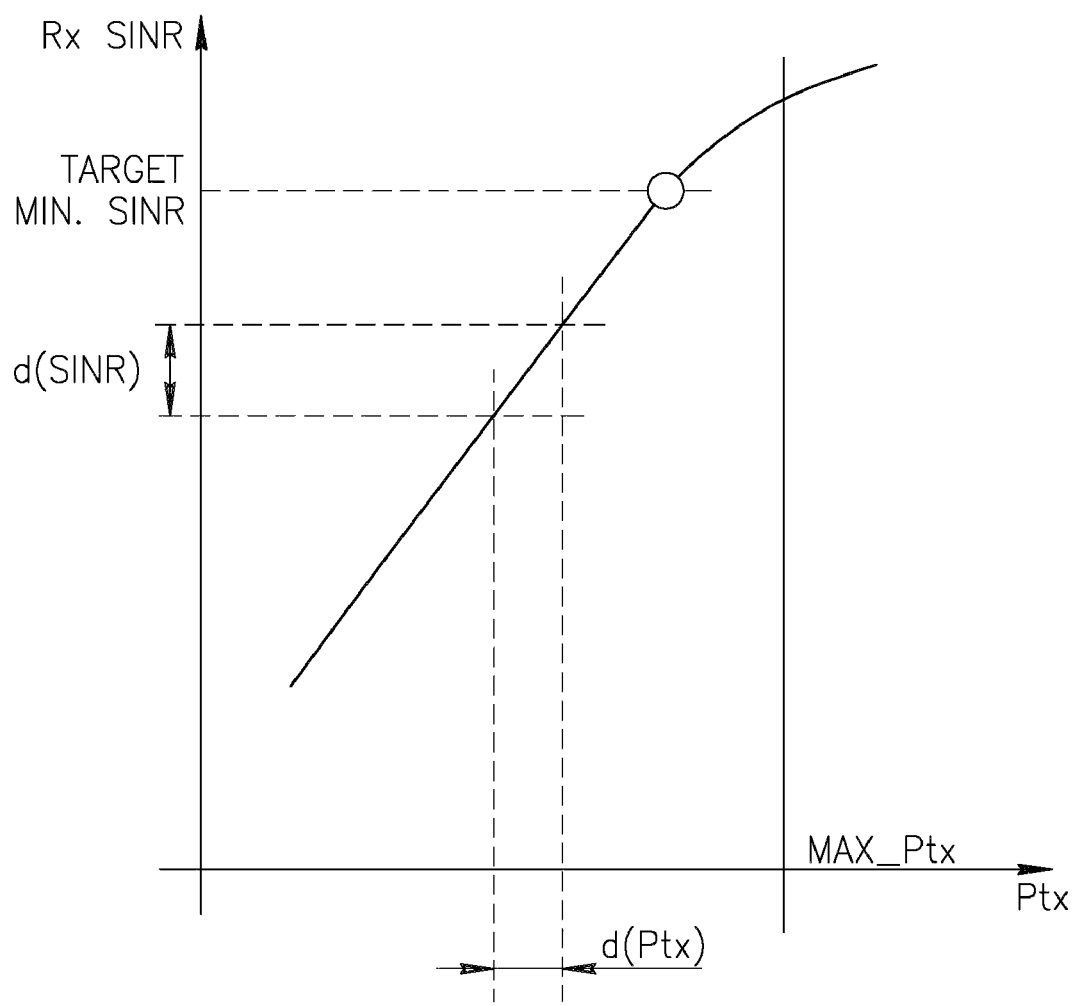

In case the target CINR is not reached (is below the range) (block 64) the transmitter node will check the CINR gradient (change in CINR due to change in power) (block 66) experienced from the last transmission. This slope is illustrated graphically in FIG. 10*b*. In case this gradient is not positive (equal to or below zero) (block 68), the node will check if it is a negative CINR gradient, which means that adding power reduces the remote CINR, which can be caused due to power amplifier saturation. If so, it will reduce power (block 70) and repeat the whole process with the newly set transmitter power (block 60).

In case a zero gradient was experienced within the link, it means that adding power does not improve CINR. This indicates that no change in power should take place (there is no advantage to adding power, because the link is interference limited).

In case a positive CINR gradient is observed, which means that adding power in the transmitter increases the CINR at the remote receiver, further power can be added (block 72). If the CINR continues to increase, the power can be increased (block 74) until the maximum power is reached (block 76), or until the CINR no longer increases with increasing power.

This link level power control process is repeated periodically in order to track cluster and network interference changes. It will be appreciated that this process can be done relatively infrequently, so as to avoid frequent increases and decreases of transmission power over the links in the clusters.

After the first phase of transmitter power control is accomplished over each link in the cluster, the feeder node will begin a process of cluster-wise interference minimization. The interference minimization mechanism for the cluster locates strong interferers within the cluster and acts to limit their transmitter power to minimize the interference they produce on other links throughout the cluster, as illustrated schematically in FIGS. 11*a* and 11*b*.

The process is managed by the feeder node and is described below:

The feeder node periodically polls every node within the cluster and requests an interference estimation of each node due to other nodes. Thus, in FIG. 11a, the feeder F requests SINR reports from the other four access points in the cluster, AP1, AP2, AP3 and AP4.

This data is analyzed, and the feeder node updates a cluster interference map, which includes cluster deployment topology and routes with their interference maps.

The feeder node monitors interference estimations on all the links and decides if interference above a pre-set threshold exists.

The feeder node analyzes the interference map to identify common interference source(s)—which are strong interferers affecting at least one other "victim" link within the cluster. In the case illustrated in FIG. 11a, access point AP4 causes unacceptable interference in all the other links in the cluster.

The feeder node orders the identified interferer to lower its Tx power, in an attempt to minimize intra-cluster interference. This process preferably includes choosing one victim link and trying to improve its SINR by reducing the TX power of the interferer. This process is carried out one by one, while each victim link's SINR is exercised by changing the TX power of each interferer, iteratively.

Figures 11A, 11B:
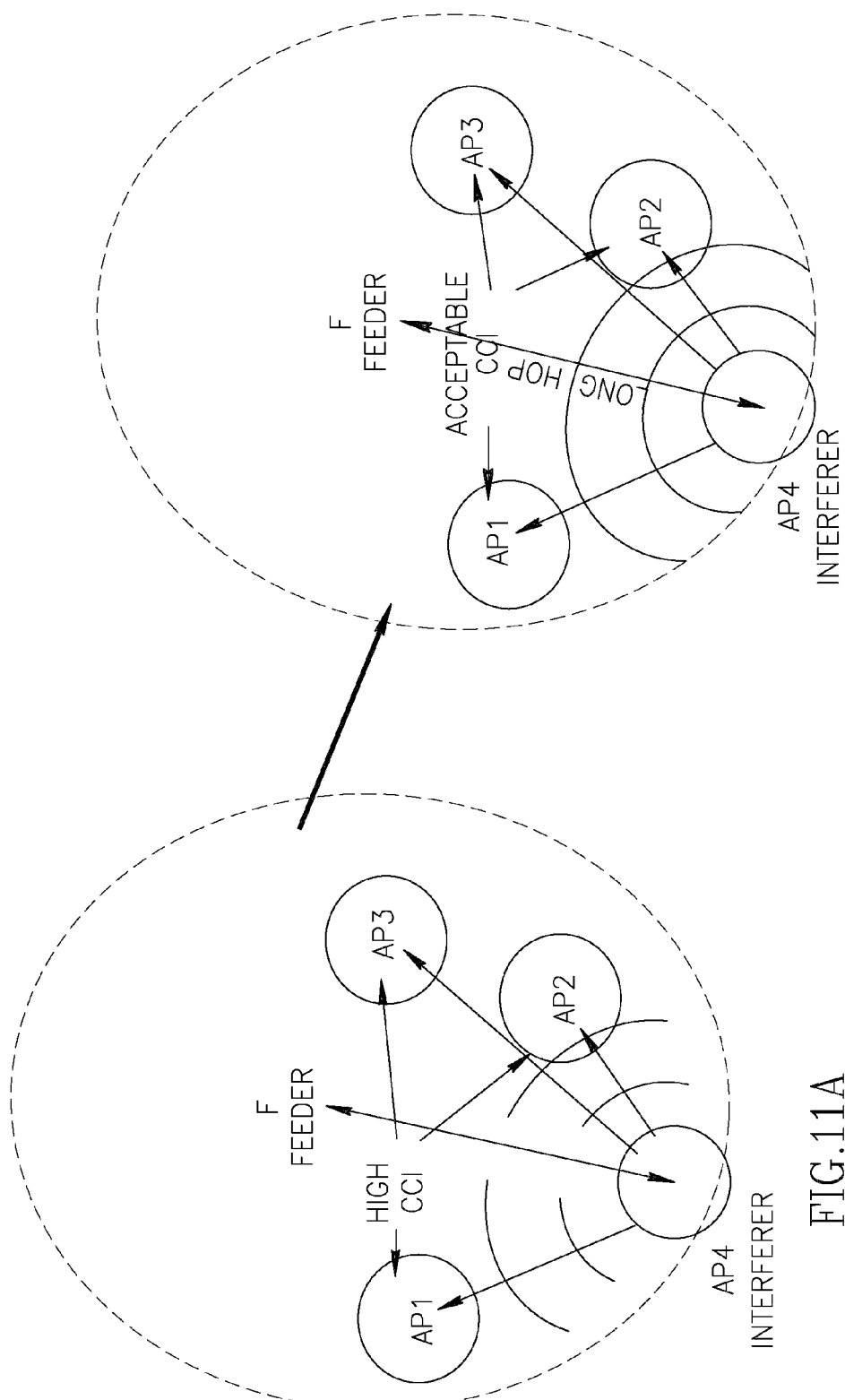
FIGS. 11a and 11b are schematic illustrations of an interference minimization mechanism for a cluster, according to one embodiment of the invention.

In this way, the transmitter power of the interferer AP4 is gradually reduced, while continuing to poll the "victim" access points' SINR, until an acceptable trade-off between the performance of all the access points is achieved, as shown, for example, in FIG. 11b. In this way, the overall performance in the link is optimized, as many gain performance at the expense of a single interferer.

It should be noted that a link which suffers from interference cannot be improved by increasing power to the link transmitter node, but only by reducing interfering transmission power over this link. Additionally, in this embodiment, it is also assumed that interference management can be done only within the cluster and not between clusters, due to lack of communication between clusters.

The methods described above serve principally to reduce the interference within each cluster. However, it will be appreciated that interference between clusters can also pose a performance limitation. One method of interference mitigation that reduces both intra-cluster and inter-cluster interference is called fractional frequency division or re-use. It is important to note that this method can be utilized both in multiple access periods and in backhaul. In multiple access periods, it is used to increase the capacity within the cluster, while in backhaul periods, it is utilized to reduce interference between clusters.

Figure 12A:
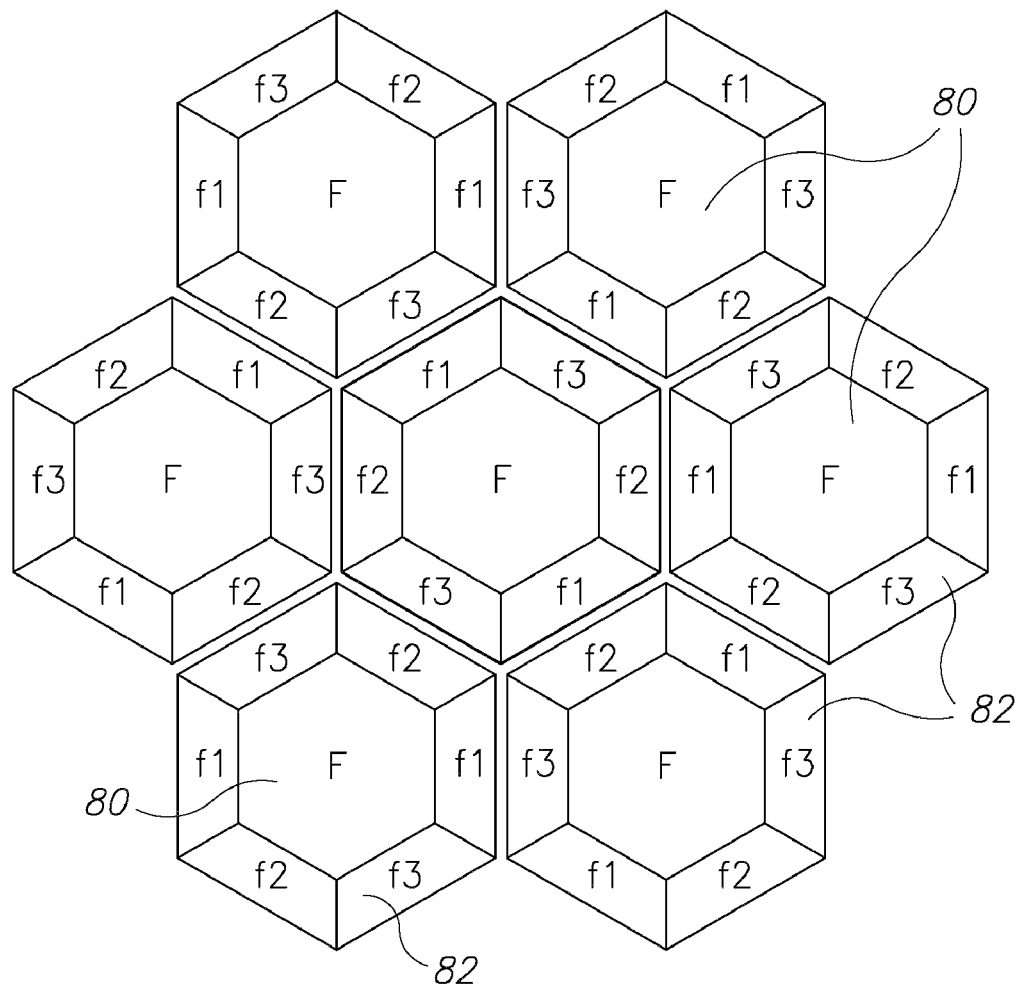
FIG. 12a is a schematic illustration of a fractional frequency re-use scheme, according to one embodiment of the invention.
Figure 12B:
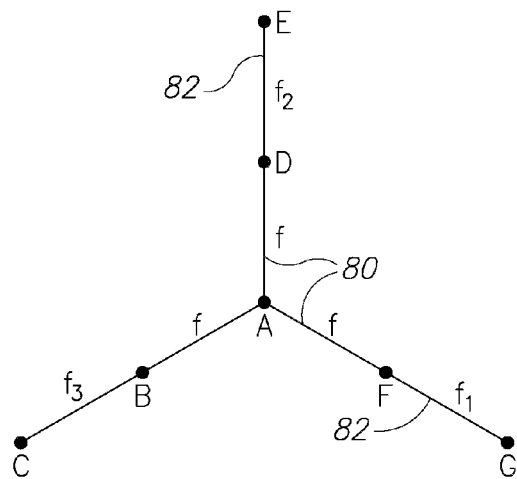

In the multiple access period, this frequency division method divides each cluster into tiers, according to number of hops from the feeder, and then into sectors, as illustrated in FIGS. 12a and 12b. The sectors in the first tier 80 utilize a 1:1 re-use scheme, i.e., all transmit and receive on the same frequency range F (over the total spectrum), while the second tier is further divided into six sub-sectors 82, and utilizes a 1:3 reuse scheme, i.e., each sector transmits and receives on one third of the total frequency range, $f_1$, $f_2$ or $f_3$. In this approach, all cells allocate the significant part of their spectrum to the users that encounter good reception conditions, whereas the rest of the spectrum is allocated to the users at the edge of the clusters in a way that neighboring clusters avoid sharing the same part of the spectrum in overlapping areas. This approach relies on feedback information from the users (e.g., based on path-loss, channel quality information or CINR estimate). It will be appreciated that in access, all nodes can transmit and receive concurrently.

In the backhaul period, the cluster is divided into tiers, according to number of hops from the feeder, as illustrated in FIG. 12b. The first hop is the first tier, which communicates in the backhaul period over a backhaul link with the first 3 access points around the feeder, and the second tier communicates over a different frequency, with a relay along the route, as described below.

Figure 12C:
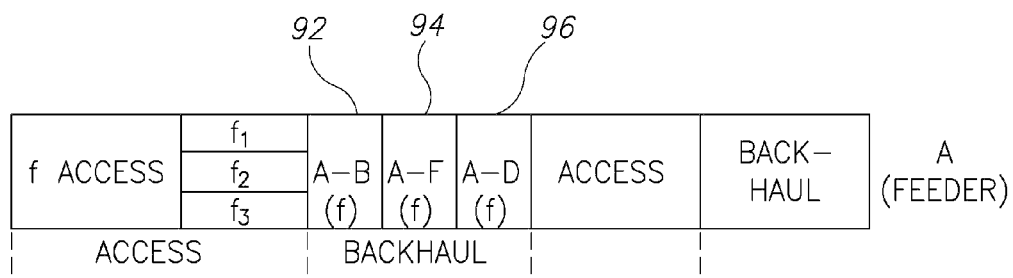
FIGS. 12c to 12g are schematic illustrations of time division among transmission frames in the cluster of FIG. 12b.
Figure 12D:
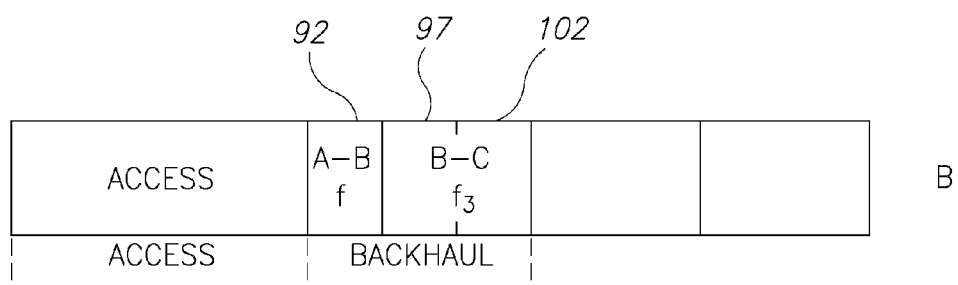

In backhaul, fractional frequency division substantially eliminates interference between clusters. An exemplary time axis for the feeder A and nodes B, C, D and F, respectively, is shown schematically in FIGS. 12c-g. Again, the relays B, D, F close to the feeder node A (the first hop, tier 1) communicate with the feeder A over the entire spectrum in TDMA. As shown in the exemplary frames in FIGS. 12c-g, each relay has a dedicated time slot for receiving (92 for B, 94 for F, and 96 for D) and for transmitting (not shown but completely symmetric) to the feeder A. The relays communicate with tier 2 (second hop nodes) C, E and G, during the full time slot on one third of the bandwidth (97 for B to C, 98 for D to F, and 99 for F to G) (FIG. 12c, 12d, 12g).

Figure 12E:
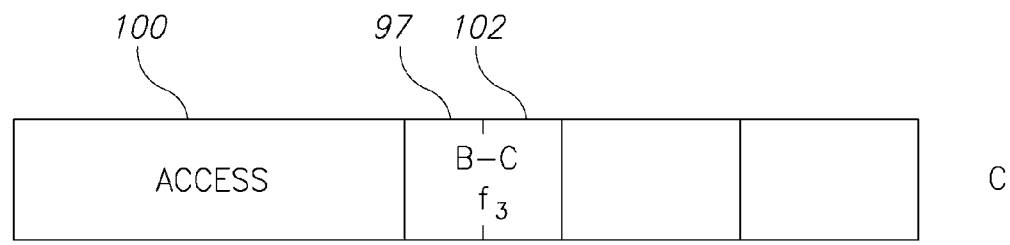
Figure 12F:
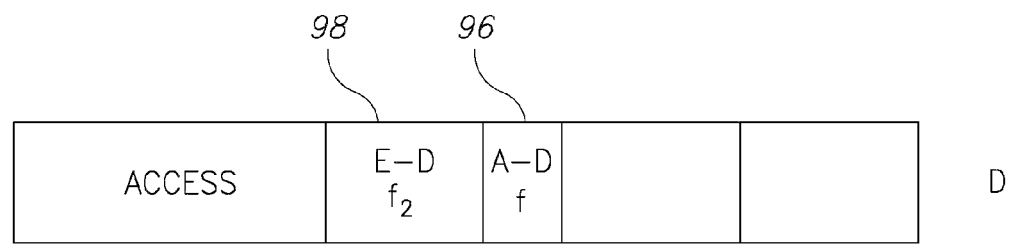
Figure 12G:
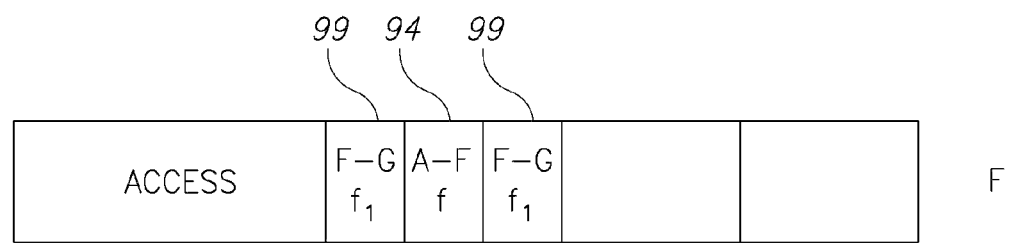

Each second tier node C, E and G, has enlarged access time 100, shown in FIG. 12e for node C. In addition, it will be appreciated that communication between the relays and second tier nodes will not dramatically degrade backhaul performance, even though only transmitting over one third the bandwidth. This is because each relay can communicate with its tier 2 node during two time slots of the first tier nodes' communication with the feeder (97 and 102 in FIGS. 12d and 12e), when each of the relays on a different path to the feeder communicates with the feeder. Furthermore, each of those time slots is longer than its own backhaul time slots 97, because the relay nodes must have time to relay traffic to and from their own mobile stations, as well as to transmit aggregated traffic to and from the tier 2 node. Thus, in the overall process, when a relay node (an access point in the middle of a route) is not communicating with the feeder in the backhaul period, it can provide additional communication time to the tier 2 access point. It will be appreciated that, in multi-hop embodiments, there can be more than 2 tiers. In this case, all except the outermost tier will utilize frequency re-use 1:1 and only the outermost tier, which is closest to adjacent clusters, will utilize frequency re-use 1:3, i.e., transmitting over $f_1$, $f_2$ or $f_3$. In addition, in other embodiments, backhaul sectorization can be to more than three sub-channels, even though access is limited to three by accepted IEEE 802.16e standards.

It will be appreciated that the fractional frequency re-use mechanism, in both access and backhaul, is an optional mechanism, which the operator can choose to operate or not, and will not impact any other mechanism described herein.

It is a particular feature of the invention that a wireless network according to the present invention has standard compliancy in the air interface between mobile stations and access points, and all processes are completely transparent to the air interface, as defined by IEEE 802.16e.

It will be appreciated by those skilled in the art that the point to point communication described above can be used to provide improved backhaul for Wi-Fi networks. In this way, MIMO and beam forming capabilities, as well as sectorization, can be provided in backhaul in Wi-Fi, which has not been dreamt of in conventional Wi-Fi technologies. Furthermore, since the same unit is also capable of providing WiMAX access, Wi-Fi networks incorporating the point to point backhaul of the present invention can provide dual mode access (Wi-Fi and WiMAX) with very strong backhaul in both.

While the invention has been described with respect to a limited number of embodiments, it will be appreciated that many variations, modifications and other applications of the invention may be made. It will further be appreciated that the invention is not limited to what has been described hereinabove merely by way of example. Rather, the invention is limited solely by the claims which follow.

The invention claimed is:

1. A mobile broadband wireless network comprising:
 at least two pairs of nodes arranged in a cluster, each pair coupled to form a link for wireless communication;
 each node including:
  an RF transceiver with associated modem;
  an antenna array arrangement, each antenna having a beam pattern selected to improve quality of transmission, coupled to said modem and arranged for multiple concurrent transmissions;
  a controller for controlling said transceiver, modem and antenna array arrangement for providing point to point communication;
  said controller including means for allocating MIMO streams and modulation to different antennas in said antenna array arrangement; and
 at least one interference mitigation mechanism implemented by said controller to minimize interference within said cluster during multiple concurrent transmissions.

2. The network according to claim 1, wherein said antenna array arrangement includes at least two directional antennas having pre-selected beam patterns.

3. The network according to claim 1, wherein said antenna array arrangement includes a plurality of omni-directional antennas, and said controller includes means for implementing smart antenna techniques to control beam patterns of said antennas.

4. The network according to claim 1, wherein said mechanism includes means for controlling transmitter power in response to link conditions.

5. The network according to claim 4, wherein said means for controlling includes means in one node in a pair for iteratively adjusting transmitter power in a second node in said pair, in order to approach a pre-defined target CINR in said one node in said link.

6. The network according to claim 4, further comprising means for adjusting transmitter power in a node which is interfering with at least one other link in said cluster, until said interference is reduced.

7. The network according to claim 6, wherein said means for adjusting includes:
 means in each node for measuring interference caused by other nodes in said cluster and providing an output signal corresponding thereto;
 means in a feeder node in said cluster for polling said plurality of nodes in said cluster to receive said output signals;
 means in said feeder for determining, from said received output signals, which node is causing interference to at least one link in said cluster; and
 means for instructing said interfering node to reduce power from its transmitter.

8. The network according to claim 1, wherein said mechanism includes means for implementing null steering of transmission beams.

9. The network according to claim 1, wherein said mechanism includes means for encoding each concurrent transmission with a different CDMA code.

10. The network according to claim 9, wherein said CDMA code includes a code from a Walsh-Hadamard family of codes.

11. The network according to claim 1, wherein said mechanism includes means in said modem and said controller for sub-channel management utilizing Orthogonal Frequency Division Multiple Access (OFDMA).

12. The network according to claim 11, wherein said means for sub-channel management includes:
 means for allocating at least one time and frequency slot from an OFDMA time/frequency map to each concurrent transmission; and
 means for mapping each said transmission to its allocated slot.

13. The network according to claim 1, wherein said mechanism includes means in a controller of a pre-selected one of said nodes for adaptively optimizing cluster point-to-point communication over said links, by tuning beam width, power, sub-carrier allocation and modulation.

14. The network according to claim 1, wherein said mechanism includes means for implementing spatial beam coordination.

15. The network according to claim 1, wherein said mechanism includes means for implementing fractional frequency re-use.

16. The network according to claim 15, wherein said means for implementing includes:
 software means for dividing said cluster into at least two concentric tiers of links;
 software means for enabling communication on a total available frequency band on links within inner tiers; and
 software means for enabling concurrent communication over one third of said available frequency band on adjacent links in an outermost tier.

17. The network according to claim 1, further comprising:
 means for creating sectorization of each said node for concurrent transmission in three directions over one third of available bandwidth.

18. The network according to claim 17, wherein:
 said antenna array arrangement includes three directional antennas; and
 said means for creating sectorization includes means for mounting said antennas such that each antenna is aimed in a different direction.

19. The network according to claim 17, wherein:
 said antenna array arrangement includes a plurality of omni-directional antennas; and
 said means for creating sectorization includes means for implementing beam forming techniques to shape said beams for communication in three directions, one to each sector.

20. The network according to claim 19, wherein said antenna array arrangement includes six omni-directional antennas arranged in two geographically separated triplets, for communication over three sectors of 120° each.

21. The network according to claim 19, wherein said antenna array arrangement includes six omni-directional antennas arranged in two sets of triplets, further comprising means for polarization of electromagnetic fields of said antennas, such that each antenna pair has a different polarization, to enable concurrent communication over three MIMO streams.

22. The network according to claim 1, wherein said controller comprises software means for implementing radio resources reuse, whereby geographically separated links communicate over the same radio resources, at the same time, for concurrent transmissions on a single radio frequency channel.

23. The network according to claim 22, wherein:
said links are separated geographically;
directional antenna beams are provided from each node;
a controller in a pre-selected one of said nodes includes means for receiving interference measurements from said links and means for centrally managing said cluster in accordance with said interference measurements; and
said nodes are deployed below roof-top level.

24. The network according to claim 1, further comprising means in said controller for adaptively allocating 1, 2 or 3 MIMO (Multiple In/Multiple Out) streams to different antennas in said antenna array arrangement for point to point (PTP) communication between nodes in a link.

25. The network according to claim 24, further comprising means for adaptive allocation of modulation and coding in said PTP communication.

26. A network for wireless communication comprising:
at least two pairs of nodes arranged in a cluster, each pair coupled to form a link for wireless point to point access and backhaul communication;
each node including:
  at least one RF transceiver providing point to point communication over the link;
  a modem coupled to each transceiver;
  an antenna array arrangement mounted in the node for providing multiple concurrent transmissions over multiple antennas, one antenna being coupled to each modem; and
  a controller in each node adapted and configured for control and coordination of said transceivers and associated modems;
  said controller including means for adaptively allocating up to three MIMO streams to different antennas in said antenna array arrangement and for adaptively allocating modulation, depending on link conditions;
said antennas having beam patterns selected for transmission quality and interference mitigation; and
at least one interference mitigation mechanism implemented by said controller to improve quality of transmission and minimize interference within said cluster during multiple concurrent transmissions.

27. A method for wireless communication comprising:
forming a plurality of nodes, each node including:
  at least one RF transceiver providing wireless point to point communication;
  a modem coupled to each transceiver;
  an antenna array arrangement mounted in the node, one antenna coupled to each modem, the antenna array arrangement providing multiple concurrent transmissions over multiple antennas, each antenna having a beam pattern;
  a controller in each node adapted and configured for control and coordination of said transceivers, modems and antenna array arrangement; and
arranging at least two pairs of said nodes in a cluster, each pair coupled to form a link for wireless point to point communication;
allocating, by said controller, MIMO streams and modulation to different antennas in said antenna array arrangement; and
providing at least one interference mitigation mechanism to be implemented by said controller to minimize interference within said cluster during multiple concurrent transmissions.

28. The method according to claim 27, wherein said step of forming includes forming said antenna array arrangement from a plurality of directional antennas.

29. The method according to claim 27, wherein said step of forming includes forming said antenna array arrangement from a plurality of omni-directional antennas, and providing antennas, and providing in said controller means for implementing smart antenna techniques to control beam patterns of said omni-directional antennas by beam forming.

30. The method according to claim 27, wherein said step of providing includes controlling transmitter power in response to link conditions.

31. The method according to claim 30, wherein said step of controlling includes iteratively adjusting transmitter power in a second node in said pair, in order to approach a pre-defined target CINR in a first node in said pair.

32. The method according to claim 30, further comprising adjusting transmitter power in a node which is interfering with at least one other link in said cluster, until said interference is reduced.

33. The method according to claim 32, wherein said step of adjusting includes:
in each node, measuring interference caused by other nodes in said cluster and providing an output signal corresponding thereto;
in said feeder, polling said plurality of nodes in said cluster to receive said output signals;
determining from said received output signals, in said feeder, which node is causing interference to at least one link in said cluster; and
instructing said interfering node to reduce power from its transmitter.

34. The method according to claim 27, wherein said step of providing includes implementing null steering of transmission beams.

35. The method according to claim 27, wherein said step of providing includes encoding each concurrent transmission with a different CDMA code.

36. The method according to claim 35, wherein said CDMA code includes a code from a Walsh-Hadamard family of codes.

37. The method according to claim 27, wherein said step of providing includes utilizing Orthogonal Frequency Division Multiple Access (OFDMA) for sub-channel management.

38. The method according to claim 37, wherein said step of utilizing includes:
allocating at least one time and frequency slot from an OFDMA time/frequency map to each concurrent transmission; and
mapping each said transmission to its allocated slot.

39. The method according to claim 27, wherein said step of providing includes adaptively optimizing, in said feeder controller, cluster point-to-point communication over said links, by tuning beam width, power, sub-carrier allocation and modulation.

40. The method according to claim 27, wherein said step of providing includes implementing spatial beam coordination.

41. The method according to claim 27, wherein said step of providing includes implementing fractional frequency re-use.

42. The method according to claim 41, wherein said step of implementing includes:

dividing said cluster into at least two concentric tiers of links;
enabling communication on a total available frequency band on links within inner tiers; and
enabling concurrent communication over one third of said available frequency band on adjacent links in an outermost tier.

43. The method according to claim 27, further comprising:
creating sectorization of each said node for concurrent transmission in three directions over one third of available bandwidth.

44. The method according to claim 43, wherein:
said antenna array arrangement includes three directional antennas; and
said step of creating sectorization includes mounting said antennas such that each antenna is aimed in a different direction.

45. The method according to claim 43, wherein:
said antenna array arrangement includes a plurality of omni-directional antennas; and
said step of creating sectorization includes implementing beam forming techniques to shape said beams for communication in three directions, one to each sector.

46. The method according to claim 45,
wherein said antenna array arrangement includes six omni-directional antennas arranged in two sets of triplets; and
further comprising the step of polarizing electromagnetic fields of said antennas, such that each stream has a different polarization, to enable concurrent communication over three MIMO streams.

47. The method according to claim 27, further comprising the step of implementing radio resources reuse, whereby geographically separated links communicate over the same radio resources, at the same time, for concurrent transmissions on a single radio frequency channel.

48. The method according to claim 47, further comprising:
deploying said nodes below roof-top level;
geographically separating said links;
providing directional antenna beams from each node; and
receiving, in a selected one of said nodes, interference measurements from said links and centrally managing said cluster in accordance with said interference measurements.

49. The method according to claim 27, further comprising adaptively allocating 1, 2 or 3 MIMO (Multiple In/Multiple Out) streams to different antennas in said antenna array arrangement for point to point communication between nodes in a link.

50. The method according to claim 49, further comprising adaptively allocating modulation and coding in said PTP communication.

51. The method according to claim 27, further comprising allocating modulation of at least 128 QAM to said PTP link.

52. The method according to claim 27, further adaptively allocating to said antennas modulation between QPSK and 256 QAM, in accordance with a pre-defined modulation adaptation scheme.

53. A method for providing wireless communication over a link including a plurality of antennas in a network, the method comprising:
deploying the link in a cluster in said network;
measuring instantaneous radio link conditions;
performing beam forming on said antennas according to said measured conditions;
allocating at least one MIMO stream to said antennas according to said measured conditions;
modulating transmissions from said antennas according to said measured conditions; and
coding said transmissions from said antennas according to said measured conditions.

54. The method according to claim 53, wherein said step of modulating includes providing modulation of at least 128 QAM to said PTP link.

55. The method according to claim 27, further comprising providing Wi-Fi access capability and providing WiMAX access capability to said cluster; wherein said point to point communication provides in-band backhaul for both Wi-Fi and WiMAX.

\* \* \* \* \*